US012444357B2

(12) United States Patent
Sun et al.

(10) Patent No.: US 12,444,357 B2
(45) Date of Patent: Oct. 14, 2025

(54) PIXEL STRUCTURE, DISPLAY PANEL, AND DISPLAY DEVICE

(71) Applicants: Beijing BOE Technology Development Co., Ltd., Beijing (CN); BOE TECHNOLOGY GROUP CO., LTD., Beijing (CN)

(72) Inventors: Tuo Sun, Beijing (CN); Lujiang Huangfu, Beijing (CN); Xuliang Zhao, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/291,949

(22) PCT Filed: Apr. 25, 2023

(86) PCT No.: PCT/CN2023/090513
§ 371 (c)(1),
(2) Date: Jan. 25, 2024

(87) PCT Pub. No.: WO2024/221208
PCT Pub. Date: Oct. 31, 2024

(65) Prior Publication Data
US 2025/0104625 A1 Mar. 27, 2025

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0842* (2013.01); *G09G 2310/08* (2013.01); *G09G 2320/0209* (2013.01)

(58) Field of Classification Search
CPC ............... G09G 3/3233; G09G 3/3291; G09G 2300/0842; G09G 2310/08; G09G 2320/0209
See application file for complete search history.

(56) References Cited

U.S. PATENT DOCUMENTS 9,466,255 B2 10/2016 Park et al.
2010/0259512 A1 10/2010 Lin et al.
(Continued)

FOREIGN PATENT DOCUMENTS

CN 105427811 A * 3/2016
CN 106531084 A 3/2017

*Primary Examiner* — Ryan A Lubit
(74) *Attorney, Agent, or Firm* — WHDA, LLP

(57) ABSTRACT

A pixel structure, a display panel and a display device are provided. The pixel structure includes: pixel circuits arranged in rows and columns, the pixel circuits including a first type and a second type of pixel circuits; a data line electrically connected to the pixel circuits, and used for providing a data voltage to the pixel circuit; the pixel circuits in two adjacent rows electrically connected to at least one data line are the first and second types of pixel circuits; light-emitting elements, including a first and a second light-emitting elements electrically connected to the first type and the second type of pixel circuits respectively; a display brightness of the first light-emitting element increases as the data voltage provided to the first type of pixel circuit increases; a display brightness of the second light-emitting element decreases as data voltage provided to the second type of pixel circuit increases.

19 Claims, 10 Drawing Sheets

(56) References Cited

U.S. PATENT DOCUMENTS

| | | | | |
|---|---|---|---|---|
| 2012/0249618 | A1* | 10/2012 | Sugiyama | H04L 25/4908 345/691 |
| 2014/0146027 | A1* | 5/2014 | Tsuge | G09G 3/3233 345/208 |
| 2016/0086552 | A1* | 3/2016 | Namkung | G09G 3/3607 345/694 |
| 2017/0221419 | A1 | 8/2017 | Xiang et al. | |
| 2018/0012547 | A1 | 1/2018 | Li et al. | |
| 2018/0130420 | A1 | 5/2018 | Gao et al. | |
| 2018/0158431 | A1* | 6/2018 | Fujikawa | G09G 3/3696 |
| 2019/0228726 | A1* | 7/2019 | Ono | G09G 3/3291 |
| 2020/0273411 | A1 | 8/2020 | Gao et al. | |
| 2023/0419897 | A1* | 12/2023 | Zhang | G09G 3/3233 |

* cited by examiner

PIXEL STRUCTURE, DISPLAY PANEL, AND DISPLAY DEVICE

CROSS-REFERENCE TO RELATED APPLICATION

The present application is the U.S. national phase of PCT Application No. PCT/CN2023/090513 filed on Apr. 25, 2023, which is incorporated herein by reference in its entirety.

TECHNICAL FIELD

The present disclosure relates to the field of display technologies, in particular to a pixel structure, a display panel and a display device.

BACKGROUND

As a display pixels per inch (PPI) increases and a row time decreases, the potential of each node in the pixel circuit is severely affected by the data voltage.

In related art, with the gradual increase in resolution requirements of an active matrix organic light-emitting diode (AMOLED) display panel in the market, the requirements for the refresh rate of the AMOLED are also increasing. Therefore, the row time (that is, the time to scan each row of the pixel circuit) is reduced, and the data writing time and threshold voltage compensation time of the pixel circuit are reduced at the same time.

The related AMOLED pixel circuit that separates data voltage writing and threshold voltage compensation is prone to block crosstalk problems.

SUMMARY

In one aspect, an embodiment of the present disclosure provides a pixel structure including:

a plurality of pixel circuits arranged in rows and columns, the plurality of pixel circuits including a first type of pixel circuit and a second type of pixel circuit;

a data line electrically connected to the pixel circuit, which is used for providing a data voltage to the pixel circuit; the pixel circuits in two adjacent rows electrically connected to at least one of the data lines are the first type of pixel circuit and the second type of pixel circuit respectively; and a plurality of light-emitting elements, including a first light-emitting element electrically connected to the first type of pixel circuit and a second light-emitting element electrically connected to the second type of pixel circuit;

a display brightness of the first light-emitting element increases as the data voltage provided to the first type of pixel circuit increases; a display brightness of the second light-emitting element decreases as data voltage provided to the second type of pixel circuit increases.

Optionally, the pixel circuits arranged in the same row are either the first type of pixel circuits or the second type of pixel circuits.

Optionally, among the pixel circuits arranged in the same row, the adjacent pixel circuits are the first type of pixel circuit and the second type of pixel circuit respectively.

Optionally, among the pixel circuits arranged in the same row, all of first pixel circuits are either the first type of pixel circuits or the second type of pixel circuits; and/or, a second pixel circuit is the first type of pixel circuit or the second type of pixel circuit;

the light-emitting element electrically connected to the first pixel circuit is a first color light-emitting element, and the light-emitting element electrically connected to the second pixel circuit is a second color light-emitting element.

Optionally, among the pixel circuits arranged in the same row, part of third pixel circuits are the first type of pixel circuits and another part of the third pixel circuits are the second type of pixel circuits;

the light-emitting element electrically connected to the third pixel circuit is a third color light-emitting element.

Optionally, a color of the first color light-emitting element, a color of the second color light-emitting element and a color of the third color light-emitting element are different from each other.

Optionally, the first pixel circuits are either the first type of pixel circuits or the second type of pixel circuits; and/or, the second pixel circuits are either the first type of pixel circuits or the second type of pixel circuits.

Optionally, the pixel circuits electrically connected to the light-emitting elements of the same color are either the first type of pixel circuits or the second type of pixel circuits.

Optionally, among the pixel circuits arranged in adjacent rows, the pixel circuits electrically connected to the same data line are arranged in the same column.

Optionally, among the pixel circuits arranged in adjacent rows, the pixel circuits electrically connected to the same data line are arranged in the adjacent columns.

Optionally, among the pixel circuits arranged in adjacent rows, the first pixel circuit and the second pixel circuit are electrically connected to a same data line, and the third pixel circuit and the second pixel circuit are electrically connected to another data line.

Optionally, among the pixel circuits arranged in adjacent rows, the first pixel circuits arranged in the same column are electrically connected to data lines of different columns, the second pixel circuits arranged in the same column are electrically connected to data lines of different columns, and the third pixel circuits arranged in the same column are electrically connected to the data line of a same column.

Optionally, the pixel structure includes a plurality of pixel units, the pixel units including a plurality of pixel circuits arranged sequentially along a row direction; the pixel units are electrically connected to data lines of columns; the plurality of pixel circuits including a first pixel circuit, a second pixel circuit and a third pixel circuit;

the pixel circuits arranged in the same row are electrically connected to data lines of different columns respectively.

Optionally, the first type of pixel circuits includes a first driving circuit, a first data writing circuit, a first energy storage circuit and a first reference voltage writing circuit;

the first driving circuit is electrically connected to a first node and the first light-emitting element, and is used for generating, under the control of a potential of the first node, a drive current to drive the first light-emitting element;

the first data writing circuit is electrically connected to a scan terminal, the data line and the first node respectively, and is used for controlling, under the control of a scan signal provided by the scan terminal, the data line to provide the data voltage to the first node in a data writing phase.

the first reference voltage writing circuit is electrically connected to an initial control terminal, a first reference voltage terminal and the first node respectively, and is used for writing, under the control of an initial control signal provided by the initial control terminal, a first reference voltage provided by the first reference voltage terminal into the first node in an initialization phase that is before the data writing phase;

the first energy storage circuit is electrically connected to the first node, and is used for storing electrical energy.

Optionally, the second type of pixel circuit includes a second driving circuit, a second data writing circuit, a second energy storage circuit and a second reference voltage writing circuit;

the second driving circuit electrically connected to a second node and the second light-emitting element, and is used for generating, under the control of a potential of the second node, a drive current to drive the second light-emitting element;

the second energy storage circuit is electrically connected to the first node, and is used for storing electrical energy;

the second data writing circuit is electrically connected to the scan terminal, the data line and the third node, and is used for writing, under the control of the scan signal provided by the scan terminal, the data voltage provided by the data line into the third node in the data writing phase;

the second reference voltage writing circuit is electrically connected to a light-emitting control terminal, a second reference voltage terminal and the third node, and is used for writing, under the control of a light-emitting control signal provided by the light-emitting control terminal, a second reference voltage provided by the first reference voltage terminal into the third node in a light-emitting phase that is after the data writing phase.

In a second aspect, an embodiment of the present disclosure provides a display panel, including the above-mentioned pixel structure.

In a third aspect, the present disclosure provides a display device, including the above-mentioned display panel.

DETAILED DESCRIPTION

Figure 1:
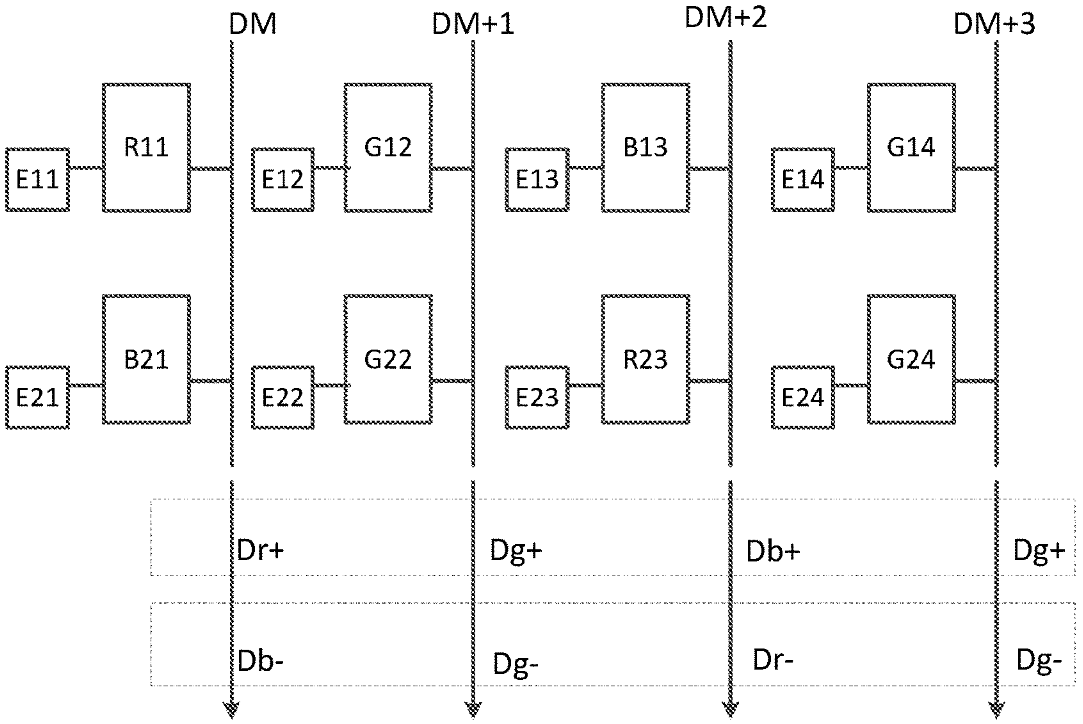
FIG. 1 is a schematic structural view of a pixel structure according to at least one embodiment of the present disclosure.

The technical solutions in the embodiments of the present disclosure will be described clearly and completely below in combination with the accompanying drawings in the embodiments of the present disclosure. Obviously, the described embodiments are only a part of the embodiments of the present disclosure but not all the embodiments. Based upon the embodiments in the present disclosure, all of other embodiments obtained by those ordinary skilled in the art without creative work pertain to the protection scope of the present disclosure.

The transistors employed in all embodiments of the present disclosure may be thin film transistors, field effect transistors or other devices with the same characteristics. In the embodiments of the present disclosure, for distinguishing the two electrodes other than the gate electrode, of the transistor, one electrode is called a first electrode, and the other electrode is called a second electrode.

In the actual operation, when the transistor is a thin film transistor or a field-effect transistor, the first electrode may be a source electrode or a drain electrode, and the second electrode may be the drain electrode or the source electrode.

A pixel structure described in embodiments of the present disclosure includes:

a plurality of pixel circuits arranged in rows and columns, the plurality of pixel circuits including a first type of pixel circuit and a second type of pixel circuit;

a data line electrically connected to the pixel circuits, which is used for providing a data voltage to the pixel circuits; the pixel circuits in two adjacent rows electrically connected to at least one of the data lines are the first type of pixel circuit and the second type of pixel circuit respectively; and a plurality of light-emitting elements, including a first light-emitting element electrically connected to the first type of pixel circuit and a second light-emitting element electrically connected to the second type of pixel circuit;

a display brightness of the first light-emitting element increases as the data voltage provided to the first type of pixel circuit increases; a display brightness of the second light-emitting element decreases as data voltage provided to the second type of pixel circuit increases.

In the related art, with the gradual increase in resolution requirements of an active matrix organic light-emitting diode (AMOLED) display panel in the market, the requirements for the refresh rate of AMOLED are also increasing. Therefore, the row time (that is, the time to scan each row of pixel circuits) is reduced, and the data writing time and threshold voltage compensation time of the pixel circuit are reduced at the same time. In order to fulfill the requirements, AMOELD pixel circuits with separation of data voltage writing and threshold voltage compensation are proposed in the related art. In general, AMOELD pixel circuits with separation of data voltage writing and threshold voltage compensation have a large capacitance area and are susceptible to voltage jumps of the surrounding signals. At the same time, due to the characteristics of the pixel circuit, the time of the threshold voltage compensation stage is larger than the time of one row, and in the threshold voltage compensation stage, the gate state of the driving transistor in the driving circuit is close to a floating state. The gate voltage of driving transistor is adversely affected by a plurality of rows of data voltages, which is prone to block crosstalk problems.

Based on this, in the pixel structure described in embodiments of the present disclosure, the adjacent rows of pixel circuits electrically connected to at least part of the data lines are first type of pixel circuits and second type of pixel circuits respectively, so that the data voltage on the data line is of high voltage and low voltage arranged in an constant alternating manner in the case of scanning a plurality of rows of gate lines in turn when the pixel structure displays a solid-colored image. Through such data voltage variation, each signal arrived in the display area is rapidly varied under the influence of the data voltage. The variation direction of each signal in the display area by the influence of the data voltage is no longer accumulated, and the amplitude of the variation is reduced, so as to reduce the incidence and the severity of a block crosstalk.

In the specific implementation, for the pixel circuit with the separation of threshold voltage compensation and data voltage writing, through controlling the change trend of the data voltage from L0 to L255, the pixel brightness increases with the increase of the data voltage according to different structural design of the pixel circuit, and the pixel brightness decreases with the increase of the data voltage. Here, L0 is grayscale 0, and L255 is grayscale 255.

In actual operation, when the first type of pixel circuit is in operation, the display brightness of the first light-emitting element electrically connected to the first type of pixel circuit increases with the increase of the data voltage received by the first type of pixel circuit;

when the second type of pixel circuit is in operation, the display brightness of the second light-emitting element electrically connected to the second type of pixel circuit decreases with the increase of the data voltage received by the second type of pixel circuit.

In at least one embodiment of the present disclosure, the structure of the first type of pixel circuit is different from the second type of pixel circuit. In the first type of pixel circuit, a reference voltage writing operation is carried out before the data voltage is written, and in the second type of pixel circuit, the reference voltage writing operation is carried out after the data voltage is written.

In the specific implementation, the first type of pixel circuit is a pixel circuit corresponding to the normally-black display mode, and the second type of pixel circuit is a pixel circuit corresponding to the normally-white display mode.

In at least one embodiment of the present disclosure, the pixel structure includes a plurality of pixel units, each pixel unit includes a plurality of pixel circuits, and the light beams emitted by the plurality of pixel circuits included in the pixel unit are capable of being mixed into white light.

Optionally, the colors of the light-emitting elements electrically connected to the plurality of pixel circuits included in the pixel unit may be different from each other, or the colors of light-emitting elements electrically connected to at least two pixel circuits among the plurality of pixel units included in the pixel structure may be different from each other.

For example, the pixel unit includes a pixel circuit electrically connected to the first pixel circuit, the second pixel circuit and the third pixel circuit; or the pixel unit includes a first pixel circuit, two second pixel circuits and a third pixel circuit; or the pixel unit includes a first pixel circuit, a second pixel circuit, a third pixel circuit and a fourth pixel circuit. The present disclosure is not limited thereto.

In actual operation, alternatively, the pixel unit may be of another structure.

Optionally, the first pixel circuit may be the pixel circuit electrically connected to a first color light-emitting element, the second pixel circuit may be the pixel circuit electrically connected to a second color light-emitting element, the third pixel circuit may be the pixel circuit electrically connected to a third color light-emitting element, and the fourth pixel circuit may be the pixel circuit electrically connected to a fourth color light-emitting element. For example, the first color light-emitting element may be a red light-emitting element, the second color light-emitting element may be a green light-emitting element, the third color light-emitting element may be a blue light-emitting element, and the fourth color light-emitting element may be a white light-emitting element.

In at least one embodiment of the present disclosure, the pixel circuits arranged in the same row may all be first type of pixel circuits or second type of pixel circuits, so that the pixel circuits in each row use the same drive signal and the layout is less difficult.

As shown in FIG. 1, under a condition of quad pixel high dynamic range (QHDR) pixel arrangement, among a plurality of pixel circuits arranged in the same row, the pixel circuits arranged in row N are all first type of pixel circuits and the pixel circuits arranged in row N+1 are all second type of pixel circuits; and N is a positive integer;

in FIG. 1, the circuit labeled R11 is the first pixel circuit in the row N and column M, the circuit labeled G12 is the second pixel circuit in the row N and column M+1, the circuit labeled B13 is the third pixel circuit in the row N and column M+2, and the circuit labeled G14 is the second pixel circuit in the row N and column M+3; M is a positive integer;

the circuit labeled B21 is the third pixel circuit in the row N+1 and column M; the circuit labeled G22 is the second pixel circuit in the row N+1 and column M+1; the circuit labeled R23 is the first pixel circuit in the row N+1 and column M+2; and the circuit labeled G24 is the second pixel circuit in the row N+1 and column M+3;

R11 and B21 are both electrically connected to data line DM in column M, G12 and G22 are both electrically connected to data line DM+1 in column M+1, B13 and R23 are both electrically connected to data line DM+2 in column M+2, G14 and G24 are both electrically connected to data line DM+3 in column M+3.

In FIG. 1, the light-emitting element labeled E11 is the red light-emitting element in row N and column M, the light-emitting element labeled E12 is a green light-emitting element in row N and column M+1, the light-emitting element labeled E13 is the blue light-emitting element in row N and column M+2, and the light-emitting element labeled E14 is the green light-emitting element in row N and column M+3;

R11 is electrically connected to E11, G12 is electrically connected to E12, B13 is electrically connected to E13, G14 is electrically connected to E14, B21 is electrically connected to E21, G22 is electrically connected to E22, R23 is electrically connected to E23, and G24 is electrically connected to E24.

In at least one embodiment of the pixel structure shown in FIGS. 1, R11, G12, B13 and G14 are all first type of pixel circuits, and B21, G22, R23 and G24 are all second type of pixel circuits.

As shown in FIG. 1, the pixel circuits arranged in row N are all first type of pixel circuits, the pixel circuits arranged in row N+1 are all second type of pixel circuits, the two rows of pixel circuits electrically connected to the data line DM in column M are first type of pixel circuit and second type of pixel circuit respectively, the two rows of pixel circuits electrically connected to the data line DM+1 in column M+1 are first type of pixel circuit and second type of pixel circuit respectively, the two rows of pixel circuits electrically connected to the data line DM+2 in column M+2 are first type of pixel circuit and second type of pixel circuit respectively, and the two rows of pixel circuits electrically connected to the data line DM+3 in column M+3 are first type of pixel circuit and second type of pixel circuit respectively.

As shown in FIG. 1, when scanning the pixel circuit in the row N, the data voltage on DM is the normally-black red data voltage Dr+, the data voltage on DM+1 is the normally-black green data voltage Dg+, the data voltage on DM+2 is the normally-black blue data voltage Db+, and the data voltage on DM+3 is the normally-black green data voltage Dg+;

when scanning the pixel circuit in the row N+1, the data voltage on DM is the normally-white blue data voltage Db−, the data voltage on DM+1 is the normally-white green data voltage Dg−, the data voltage on DM+2 is the normally-white red data voltage Dr−, and the data voltage on DM+3 is the normally-white green data voltage Dg−.

When at least one embodiment of the pixel structure shown in FIG. 1 operating, the pixel circuits in row N may all be electrically connected to the gate line in row N, and the pixel circuits in row N+1 may all be electrically connected to the gate line in row N+1. When scanning a plurality of rows of pixel circuits in turn and displaying a solid-color image, the data voltages of the data lines in the various columns are constantly alternating between a high voltage and a low voltage, so that the drive signals in the pixel circuits are rapidly varied by the influence of the data voltages. The direction of the variations is no longer accumulated, and the amplitude of the variations is reduced, so as to reduce the incidence and the severity of the block crosstalk.

At least one embodiment of the pixel structure shown in FIG. 1 can achieve a similar effect of row inversion or dot inversion when operating.

In at least one embodiment of the pixel structure shown in FIG. 1, each of R11, G12, B13, and G14 may be replaced with a second type of pixel circuit, and each of B21, G22, R23, and G24 may be replaced with a first type of pixel circuit.

In at least one embodiment of the present disclosure, among the pixel circuits arranged in the same row, the adjacent pixel circuits are the first type of pixel circuit and the second type of pixel circuit respectively.

Figure 2:
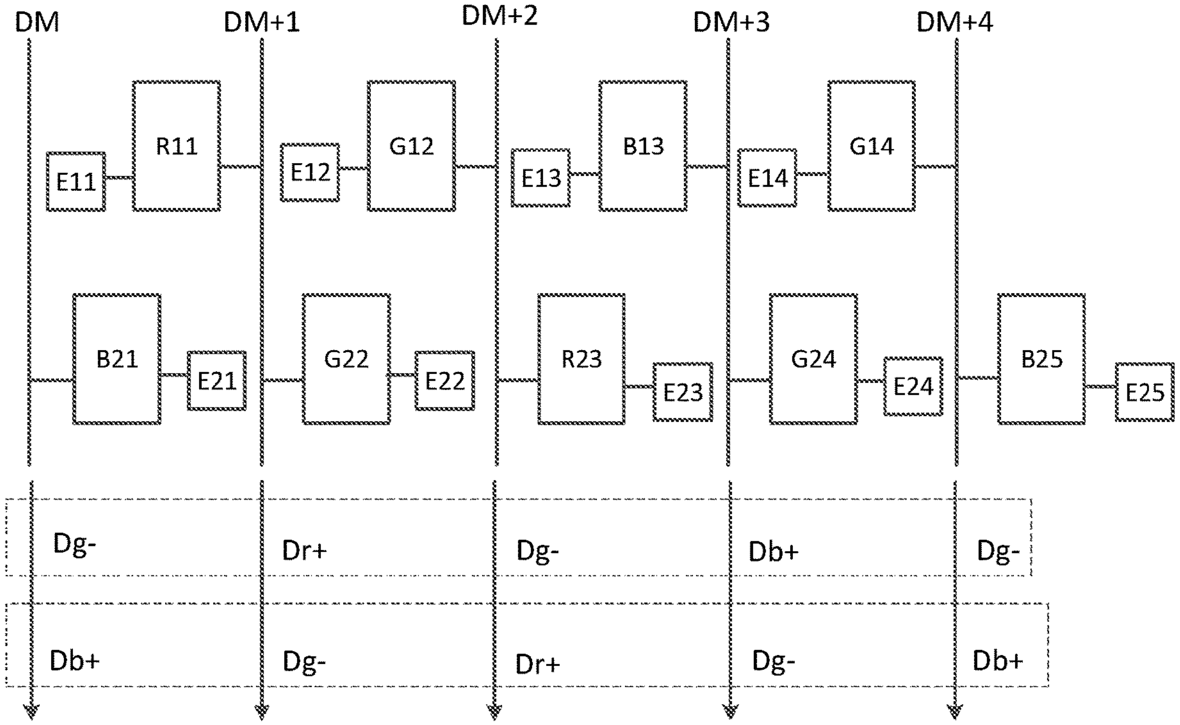
FIG. 2 is a schematic structural view of the pixel structure according to at least one embodiment of the present disclosure.

As shown in FIG. 2, under the condition of the pixel arrangement of the quad pixel high dynamic range imaging (QHDR), among the pixel circuits arranged in the same row, the adjacent pixel circuits are the first type of pixel circuit and the second type of pixel circuit respectively;

the circuit labeled R11 is the first pixel circuit in the row N and column M, the circuit labeled G12 is the second pixel circuit in the row N and column M+1, the circuit labeled B13 is the third pixel circuit in the row N and column M+2, and the circuit labeled G14 is the second pixel circuit in the row N and column M+3; M and N are positive integers;

the circuit labeled B21 is the third pixel circuit in the row N+1 and column M; the circuit labeled G22 is the second pixel circuit in the row N+1 and column M+1; the circuit labeled R23 is the first pixel circuit in the row N+1 and column M+2; the circuit labeled G24 is the second pixel circuit in the row N+1 and column M+3, and the circuit labeled B25 is the third pixel circuit in the row N+1 and column M+4;

B21 is electrically connected to data line DM in column M, R11 and G22 are both electrically connected to data line DM+1 in column M+1, G12 and R23 are both electrically connected to data line DM+2 in column M+2, B13 and G24 are both electrically connected to data line DM+3 in column M+3, and B25 is electrically connected to data line DM+4 in column M+4.

In FIG. 2, the light-emitting element labeled E11 is the red light-emitting element in row N and column M, the light-emitting element labeled E12 is a green light-emitting element in row N and column M+1, the light-emitting element labeled E13 is the blue light-emitting element in row N and column M+2, and the light-emitting element labeled E14 is the green light-emitting element in row N and column M+3;

the light-emitting element labeled E21 is the blue light-emitting element in row N+1 and column M, the light-emitting element labeled E22 is a green light-emitting element in row N+1 and column M+1, the light-emitting element labeled E23 is the red light-emitting element in row N+1 and column M+2, the light-emitting element labeled E24 is the green light-emitting element in row N+1 and column M+3, and the light-emitting element labeled E25 is the green light-emitting element in row N+1 and column M+4.

R11 is electrically connected to E11, G12 is electrically connected to E12, B13 is electrically connected to E13, and G14 is electrically connected to E14;

B21 is electrically connected to E21, G22 is electrically connected to E22, R23 is electrically connected to E23, G24 is electrically connected to E24, and G25 is electrically connected to E25.

In at least one embodiment of the pixel structure shown in FIGS. 2, R11, B13, B21, R23 and B25 are all first type of pixel circuits, and G12, G14, G22 and G24 are all second type of pixel circuits.

In at least one embodiment of the pixel structure shown in FIG. 2, DM may be electrically connected to the green pixel circuit in the row N and column M−1. The green pixel circuit in the row N and column M−1 may be a normally-white green pixel circuit.

As shown in FIG. 2, when scanning the pixel circuit in the row N, the data voltage on DM is the normally-white green data voltage Dg−, the data voltage on DM+1 is the normally-black red data voltage Dr+, the data voltage on DM+2 is the normally-white green data voltage Dg−, and the data voltage on DM+3 is the normally-black blue data voltage Db+, and the data voltage on DM+4 is the normally-white green data voltage Dg−;

when scanning the pixel circuit in the row N+1, the data voltage on DM is the normally-black blue data voltage Db+, the data voltage on DM+1 is the normally-white green data voltage Dg−, the data voltage on DM+2 is the normally-black red data voltage Dr+, the data voltage on DM+3 is the normally-white green data voltage Dg−, the data voltage on DM+4 is the normally-black blue data voltage Db+.

When at least one embodiment of the pixel structure shown in FIG. 2 operating, the pixel circuits in row N may all be electrically connected to the gate line in row N, and the pixel circuits in row N+1 may all be electrically connected to the gate line in row N+1. When scanning a plurality of rows of pixel circuits in turn and displaying a solid-color image, the data voltages of the data lines on the various columns are constantly alternating between a high voltage and a low voltage, so that the drive signals in the pixel circuits are rapidly varied by the influence of the data voltages. The direction of the variations is no longer accumulated, and the amplitude of the variations is reduced, so as to reduce the incidence and the severity of a block crosstalk.

In at least one embodiment of the pixel structure shown in FIG. 2, the first pixel circuits are all first type of pixel circuits, the second pixel circuits are all first type of pixel circuits, and the third pixel circuits are all second type of pixel circuits, that is, the pixel circuits electrically connected to the light-emitting elements of the same color are all first type of pixel circuits or first type of pixel circuits, so as to facilitate Gamma adjustment.

In at least one embodiment of the present disclosure, in order to facilitate Gamma adjustment, the layout can be adjusted so that the structures of pixel circuits of the same color pixel circuit are same.

In a specific implementation, under the QHDR pixel arrangement, the second pixel circuits electrically connected to the green light-emitting elements accounts for half, the first pixel circuits electrically connected to the red light-emitting element and the third pixel circuit electrically connected to the blue light-emitting elements together account for half. Therefore, the first pixel circuits electrically connected to the red light-emitting element and the third pixel circuit electrically connected to the blue light-emitting element can be set as the first type of pixel circuit, while the second pixel circuits electrically connected to the green light-emitting element can be set as the second type of pixel circuit. Or, the first pixel circuits electrically connected to the red light-emitting elements and the third pixel circuits electrically connected to the blue light-emitting elements can be set as the second type of pixel circuit, while the second pixel circuits electrically connected to the green light-emitting elements can be set as the first type of pixel circuit.

Figure 3:
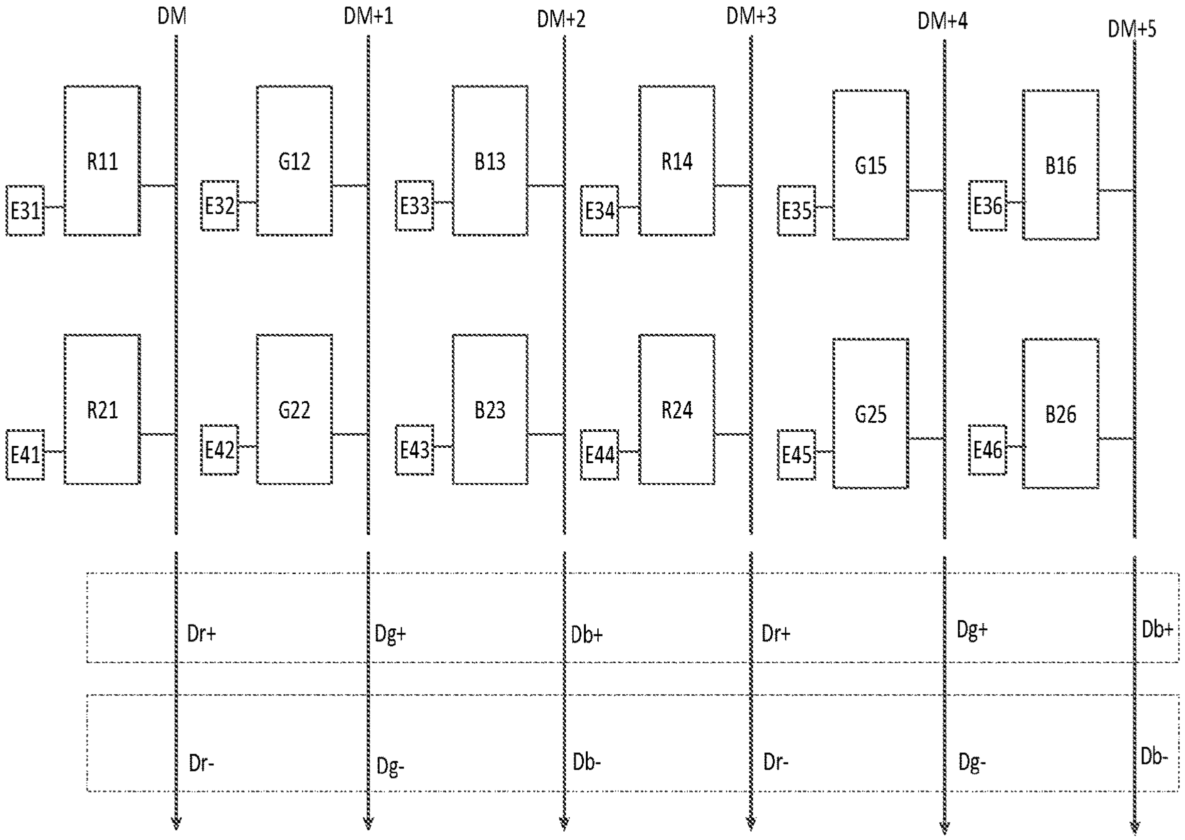
FIG. 3 is a schematic structural view of the pixel structure according to at least one embodiment of the present disclosure.

As shown in FIG. 3, under real red, green and blue (RGB) pixel arrangement conditions, among the pixel circuits arranged in the same row, the pixel circuits arranged in row N are all first type of pixel circuits and the pixel circuits arranged in row N+1 are all second type of pixel circuits; and N is a positive integer;

in FIG. 3, the circuit labeled R11 is the first pixel circuit in the row N and column M, the circuit labeled G12 is the second pixel circuit in the row N and column M+1, the circuit labeled B13 is the third pixel circuit in the row N and column M+2, the circuit labeled R14 is the first pixel circuit in the row N and column M+3, the circuit labeled G15 is the second pixel circuit in the row N and column M+4, and the circuit labeled B16 is the third pixel circuit in the row N and column M+5;

the circuit labeled R21 is the first pixel circuit in the row N+1 and column M; the circuit labeled G22 is the second pixel circuit in the row N+1 and column M+1, the circuit labeled B23 is the third pixel circuit in the row N+1 and column M+2, the circuit labeled R24 is the first pixel circuit in the row N+1 and column M+3, the circuit labeled G25 is the second pixel circuit in the row N+1 and column M+4, the circuit labeled B26 is the third pixel circuit in the row N+1 and column M+5; M is a positive integer;

R11 and R21 are both electrically connected to data line DM in column M, G12 and G22 are both electrically connected to data line DM+1 in column M+1, B13 and B23 are both electrically connected to data line DM+2 in column M+2, R14 and R24 are both electrically connected to data line DM+3 in column M+3, G15 and G25 are both electrically connected to data line DM+1 in column M+4, and B16 and B26 are both electrically connected to data line DM+2 in column M+5.

In FIG. 3, the light-emitting element labeled E31 is the red light-emitting element in row N and column M, the light-emitting element labeled E32 is a green light-emitting element in row N and column M+1, the light-emitting element labeled E33 is the blue light-emitting element in row N and column M+2, the light-emitting element labeled E34 is the red light-emitting element in row N and column M+3, the light-emitting element labeled E35 is the green light-emitting element in row N and column M+4, and the light-emitting element labeled E36 is the blue light-emitting element in row N and column M+5;

the light-emitting element labeled E41 is the red light-emitting element in row N+1 and column M, the light-emitting element labeled E42 is a green light-emitting element in row N+1 and column M+1, the light-emitting element labeled E43 is the blue light-emitting element in row N+1 and column M+2, the light-emitting element labeled E44 is the red light-emitting element in row N+1 and column M+3, the light-emitting element labeled E45 is the green light-emitting element in row N+1 and column M+4, and the light-emitting element labeled E46 is the blue light-emitting element in row N+1 and column M+5;

R11 is electrically connected to E31, G12 is electrically connected to E32, B13 is electrically connected to E33, R14 is electrically connected to E54, G15 is electrically connected to E35, and B15 is electrically connected to E36;

R21 is electrically connected to E24, G22 is electrically connected to E24, B23 is electrically connected to E43, R24 is electrically connected to E44, G25 is electrically connected to E45, and B25 is electrically connected to E46. In at least one embodiment of the pixel structure shown in FIGS. 3, R11, G12, B13, R14, G15, and B16 are all first type of pixel circuits, and R21, G22, B23, R24, G25, and B26 are all second type of pixel circuits.

As shown in FIG. 3, the pixel circuits arranged in row N are all first type of pixel circuits, the pixel circuits arranged in row N+1 are all second type of pixel circuits, the two rows of pixel circuits electrically connected to the data line DM in column M are first type of pixel circuit and second type of pixel circuit respectively, the two rows of pixel circuits electrically connected to the data line DM+1 in column M+1 are first type of pixel circuit and second type of pixel circuit respectively, the two rows of pixel circuits electrically connected to the data line DM+2 in column M+2 are first type of pixel circuit and second type of pixel circuit respectively, the two rows of pixel circuits electrically connected to the data line DM+3 in column M+3 are first type of pixel circuit and second type of pixel circuit respectively, the two rows of pixel circuits electrically connected to the data line DM+4 in column M+4 are first type of pixel circuit and second type of pixel circuit respectively, and the two rows of pixel circuits electrically connected to the data line DM+5 in column M+5 are first type of pixel circuit and second type of pixel circuit respectively.

As shown in FIG. 3, when scanning the pixel circuit in the row N, the data voltage on DM is the normally-black red data voltage Dr+, the data voltage on DM+1 is the normally-black green data voltage Dg+, the data voltage on DM+2 is the normally-black blue data voltage Db+, the data voltage on DM+3 is the normally-black red data voltage Dr+, the data voltage on DM+4 is the normally-black green data voltage Dg+, and the data voltage on DM+5 is the normally-black blue data voltage Db+;

when scanning the pixel circuit in the row N+1, the data voltage on DM is the normally-white red data voltage Dr−, the data voltage on DM+1 is the normally-white green data voltage Dg−, the data voltage on DM+2 is the normally-white blue data voltage Db−, the data voltage on DM+3 is the normally-white red data voltage Dr−, the data voltage on DM+4 is the normally-white green data voltage Dg−, and the data voltage on DM+5 is the normally-white blue data voltage Db−.

When at least one embodiment of the pixel structure shown in FIG. 3 operating, the pixel circuits in row N may all be electrically connected to the gate line in row N, and the pixel circuits in row N+1 may all be electrically connected to the gate line in row N+1. When scanning a plurality of rows of pixel circuits in turn and displaying a solid-color image, the data voltages of the data lines on the various columns are constantly alternating between a high voltage and a low voltage, so that the drive signals in the pixel circuits are rapidly varied by the influence of the data voltages. The direction of the variations is no longer accumulated, and the amplitude of the variations is reduced, so as to reduce the incidence and the severity of a block crosstalk.

In at least one embodiment of the pixel structure shown in FIG. 3, the pixel circuits in each row are all either first type of pixel circuits or second type of pixel circuits, such that the drive signals for the pixel circuits in each row are consistent and the layout is less difficult.

In at least one embodiment of the pixel structure shown in FIG. 3, the pixel circuits in row N may be replaced with the second type of pixel circuits, and the pixel circuits in row N+1 may be replaced with the first type of pixel circuits.

Figure 4:
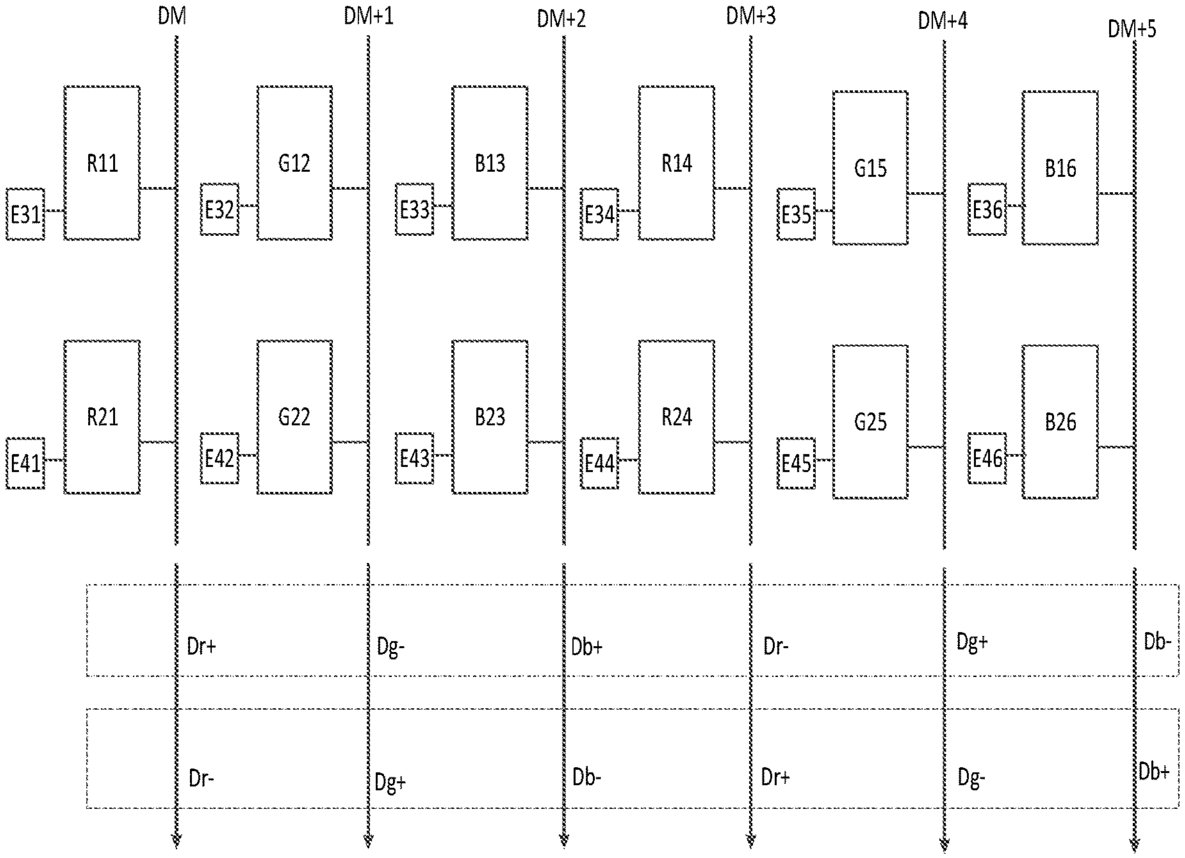
FIG. 4 is a schematic structural view of the pixel structure according to at least one embodiment of the present disclosure.

As shown in FIG. 4, under a condition of real red, green and blue (RGB) pixel arrangement, among a plurality of pixel circuits arranged in the same row, the adjacent pixel circuits are the first type of pixel circuit and the second type of pixel circuit respectively.

In FIG. 4, the circuit labeled R11 is the first pixel circuit in the row N and column M, the circuit labeled G12 is the second pixel circuit in the row N and column M+1, the circuit labeled B13 is the third pixel circuit in the row N and column M+2, the circuit labeled R14 is the first pixel circuit in the row N and column M+3, the circuit labeled G15 is the second pixel circuit in the row N and column M+4, and the circuit labeled B16 is the third pixel circuit in the row N and column M+5;

the circuit labeled R21 is the first pixel circuit in the row N+1 and column M; the circuit labeled G22 is the second pixel circuit in the row N+1 and column M+1, the circuit labeled B23 is the third pixel circuit in the row N+1 and column M+2, the circuit labeled R24 is the first pixel circuit in the row N+1 and column M+3, the circuit labeled G25 is the second pixel circuit in the row N+1 and column M+4, the circuit labeled B26 is the third pixel circuit in the row N+1 and column M+5; M is a positive integer;

R11 and R21 are both electrically connected to data line DM in column M, G12 and G22 are both electrically connected to data line DM+1 in column M+1, B13 and B23 are both electrically connected to data line DM+2 in column M+2, R14 and R24 are both electrically connected to data line DM+3 in column M+3, G15 and G25 are both electrically connected to data line DM+1 in column M+4, and B16 and B26 are both electrically connected to data line DM+2 in column M+5.

In FIG. 4, the light-emitting element labeled E31 is the red light-emitting element in row N and column M, the light-emitting element labeled E32 is a green light-emitting element in row N and column M+1, the light-emitting element labeled E33 is the blue light-emitting element in row N and column M+2, the light-emitting element labeled E34 is the red light-emitting element in row N and column M+3, the light-emitting element labeled E35 is the green light-emitting element in row N and column M+4, and the light-emitting element labeled E36 is the blue light-emitting element in row N and column M+5;

the pixel circuit labeled E41 is the red pixel circuit in the row N+1 and column M, the light-emitting element labeled E42 is a green light-emitting element in row N+1 and column M+1, the light-emitting element labeled E43 is the blue light-emitting element in row N+1 and column M+2, the light-emitting element labeled E44 is the red light-emitting element in row N+1 and column M+3, the light-emitting element labeled E45 is the green light-emitting element in row N+1 and column M+4, and the light-emitting element labeled E46 is the blue light-emitting element in row N+1 and column M+5.

As shown in FIG. 4, R11 is electrically connected to E31, G12 is electrically connected to E32, B13 is electrically connected to E33, R14 is electrically connected to E34, R15 is electrically connected to E35, and R16 is electrically connected to E36;

R21 is electrically connected to E41, G22 is electrically connected to E42, B23 is electrically connected to E43, R24 is electrically connected to E44, R25 is electrically connected to E45, and R26 is electrically connected to E46.

In at least one embodiment of the pixel structure shown in FIGS. 4, R11, B13, G15, G22, R24, and B26 are all first type of pixel circuits, and G12, R14, B16, R21, B23, and G25 are all second type of pixel circuits.

In at least one embodiment shown in FIG. 4, the two rows of pixel circuits electrically connected to DM are the first type of pixel circuit and the second type of pixel circuit respectively, the two rows of pixel circuits electrically connected to DM+1 are the first type of pixel circuit and the second type of pixel circuit respectively, the two rows of pixel circuits electrically connected to DM+2 are the first type of pixel circuit and the second type of pixel circuit respectively, the two rows of pixel circuits electrically connected to DM+3 are the first type of pixel circuit and the second type of pixel circuit respectively, the two rows of pixel circuits electrically connected to DM+4 are the first type of pixel circuit and the second type of pixel circuit respectively, the two rows of pixel circuits electrically connected to DM+5 are the first type of pixel circuit and the second type of pixel circuit respectively.

As shown in FIG. 4, when scanning the pixel circuit in the row N, the data voltage on DM is the normally-black red data voltage Dr+, the data voltage on DM+1 is the normally-white green data voltage Dg−, the data voltage on DM+2 is the normally-black blue data voltage Db+, the data voltage on DM+3 is the normally-black red data voltage Dr−, the data voltage on DM+4 is the normally-black green data voltage Dg+, and the data voltage on DM+5 is the normally-white blue data voltage Db−;

when scanning the pixel circuit in the row N+1, the data voltage on DM is the normally-white red data voltage Dr−, the data voltage on DM+1 is the normally-black green data voltage Dg+, the data voltage on DM+2 is the normally-white blue data voltage Db−, the data voltage on DM+3 is the normally-black red data voltage Dr+, the data voltage on DM+4 is the normally-white green data voltage Dg−, and the data voltage on DM+5 is the normally-black blue data voltage Db+;

when at least one embodiment of the pixel structure shown in FIG. 4 operating, the pixel circuits in row N may all be electrically connected to the gate line in row N, and the pixel circuits in row N+1 may all be electrically connected to the gate line in row N+1. When scanning a plurality of rows of pixel circuits in turn and displaying a solid-color image, the data voltages of the data lines on the various columns are constantly alternating between a high voltage and a low voltage, so that the drive signals in the pixel circuits are rapidly varied by the influence of the data voltages. The direction of the variations is no longer accumulated, and the amplitude of the variations is reduced, so as to reduce the incidence and the severity of a block crosstalk.

When at least one embodiment of the pixel structure shown in FIG. 4 operates, in order to further control the amplitude of the voltage jump, the adjacent pixel circuits in each row of pixel circuits are controlled to be a first type of pixel circuit and a second type of pixel circuit respectively. In this arrangement, when the data voltage of each row of pixel circuits alternates, half of the data voltages of pixel circuits jumps down, and half of the data voltages of pixel circuits jumps up. The jump trends of the two parts of the data voltages offset each other, which further reduces the actual disturbance to each signal inside the pixel circuit.

Optionally, among the pixel circuits arranged in the same row, first pixel circuits are all either the first type of pixel circuits or the second type of pixel circuits; and/or, a second pixel circuit is the first type of pixel circuit or the second type of pixel circuits;

the light-emitting element electrically connected to the first pixel circuit is a first color light-emitting element, and the light-emitting element electrically connected to the second pixel circuit is a second color light-emitting element.

Optionally, among the pixel circuits arranged in the same row, part of third pixel circuits are the first type of pixel circuits and another part of the third pixel circuits are the second type of pixel circuits;

the light-emitting element electrically connected to the third pixel circuit is a third color light-emitting element.

In at least one embodiment of the present disclosure, a color of the first color light-emitting element, a color of the second color light-emitting element and a color of the third color light-emitting element are different from each other.

In at least one embodiment of the present disclosure, the first color light-emitting element may be a red light-emitting element, the second color light-emitting element may be a green light-emitting element, and the third color light-emitting element may be a blue light-emitting element, but the present disclosure is not limited thereto.

In specific implementation, since the brightness of the red light-emitting element and the brightness of the green light-emitting element are high, among the plurality of pixel circuits in the same row, the types of the first pixel circuits may be set to be same and the types of the second pixel circuits may be set to be same. However, since the brightness of the blue light-emitting element is low, the third pixel circuit may be provided with two different types of pixel circuits.

In at least one embodiment of the present disclosure, first pixel circuits are all either the first type of pixel circuits or the second type of pixel circuits; and/or, a second pixel circuit is the first type of pixel circuit or the second type of pixel circuit.

In specific implementation, in the pixel structure, the structures of the first pixel circuits may all be the same, and the structures of the second pixel circuits may all be the same, so as to control the types of pixel circuits electrically connected to the same color light-emitting element to be the same.

Figure 5:
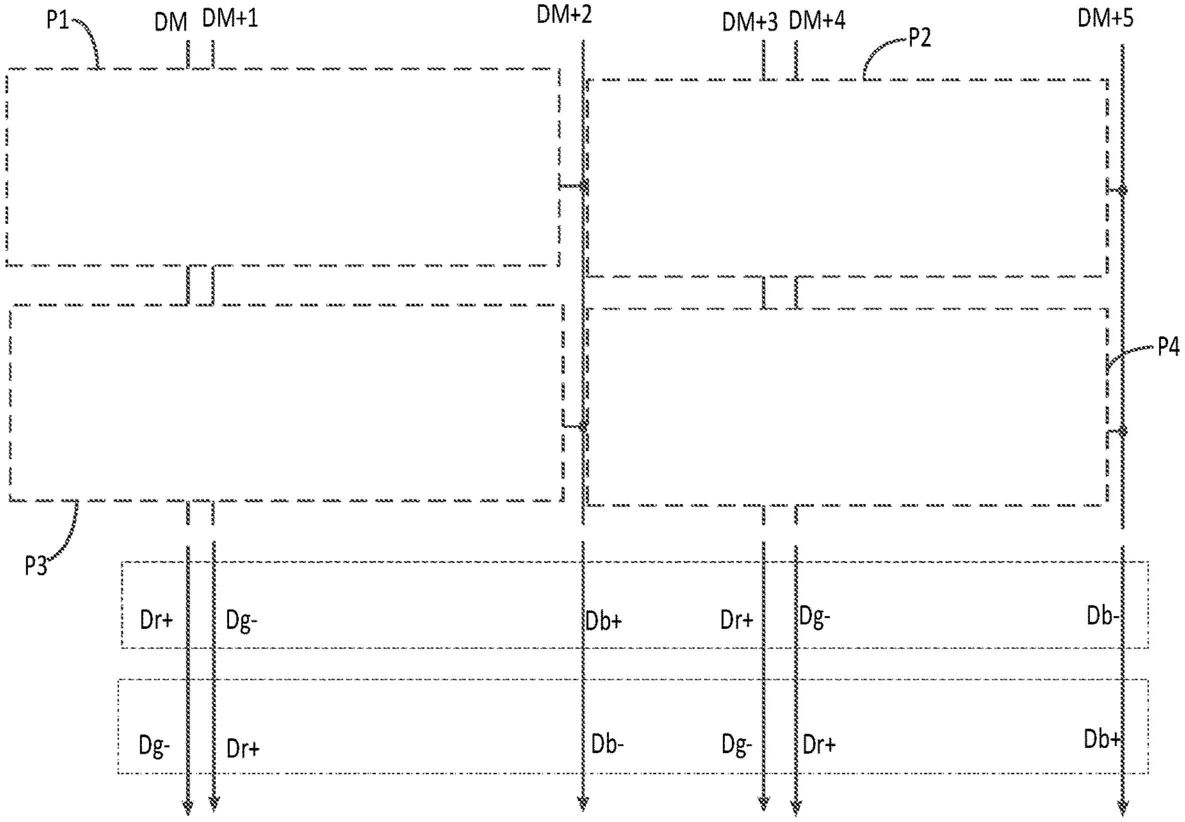
FIG. 5 is a schematic structural view of the pixel structure according to at least one embodiment of the present disclosure.

As shown in FIG. 5, under the condition of real red, green and blue (RGB) pixel arrangement, the first pixel circuits are all the first type of pixel circuits and the second pixel circuits are all the second type of pixel circuits;

in FIG. 5, the circuit labeled R11 is the first pixel circuit in the row N and column M, the circuit labeled G12 is the second pixel circuit in the row N and column M+1, the circuit labeled B13 is the third pixel circuit in the row N and column M+2, the circuit labeled R14 is the first pixel circuit in the row N and column M+3, the circuit labeled G15 is the second pixel circuit in the row N and column M+4, and the circuit labeled B16 is the third pixel circuit in the row N and column M+5;

the circuit labeled R21 is the first pixel circuit in the row N+1 and column M; the circuit labeled G22 is the second pixel circuit in the row N+1 and column M+1, the circuit labeled B23 is the third pixel circuit in the row N+1 and column M+2, the circuit labeled R24 is the first pixel circuit in the row N+1 and column M+3, the circuit labeled G25 is the second pixel circuit in the row N+1 and column M+4, the circuit labeled B26 is the third pixel circuit in the row N+1 and column M+5; M is a positive integer;

B13 is the first type of pixel circuit, B16 is the second type of pixel circuit, B23 is the second type of pixel circuit, and B26 is the first type of pixel circuit;

R11 and G22 are both electrically connected to data line DM in column M, G12 and R21 are both electrically connected to data line DM+1 in column M+1, B13 and B23 are both electrically connected to data line DM+2 in column M+2, R14 and G25 are both electrically connected to data line DM+3 in column M+3, G15 and R24 are both electrically connected to data line DM+4 in column M+4, and B16 and B26 are both electrically connected to data line DM+5 in column M+5.

In FIG. 5, the light-emitting element labeled E31 is the red light-emitting element in row N and column M, the light-emitting element labeled E32 is a green light-emitting element in row N and column M+1, the light-emitting element labeled E33 is the blue light-emitting element in row N and column M+2, the light-emitting element labeled E34 is the red light-emitting element in row N and column M+3, the light-emitting element labeled E35 is the green light-emitting element in row N and column M+4, and the light-emitting element labeled E36 is the blue light-emitting element in row N and column M+5;

the light-emitting element labeled E41 is the red light-emitting element in row N+1 and column M, the light-emitting element labeled E42 is a green light-emitting element in row N+1 and column M+1, the light-emitting element labeled E43 is the blue light-emitting element in row N+1 and column M+2, the light-emitting element labeled E44 is the red light-emitting element in row N+1 and column M+3, the light-emitting element labeled E45 is the green light-emitting element in row N+1 and column M+4, and the light-emitting element labeled E46 is the blue light-emitting element in row N+1 and column M+5;

R11 is electrically connected to E31, G12 is electrically connected to E32, B13 is electrically connected to E33, R14 is electrically connected to E34, G15 is electrically connected to E35, and B16 is electrically connected to E36;

R21 is electrically connected to E41, G22 is electrically connected to E42, B23 is electrically connected to E43, R24 is electrically connected to E44, G25 is electrically connected to E45, and B26 is electrically connected to E46.

In at least one embodiment of the pixel structure shown in FIGS. 5, R11, B13, R14, R21, R24 and B26 are all first type of pixel circuits, and G12, G15, B16, G22 and G25 are all second type of pixel circuits.

As shown in FIG. 5, when scanning the pixel circuit in the row N, the data voltage on DM is the normally-black red data voltage Dr+, the data voltage on DM+1 is the normally-white green data voltage Dg−, the data voltage on DM+2 is the normally-black blue data voltage Db+, the data voltage on DM+3 is the normally-black red data voltage Dr+, the data voltage on DM+4 is the normally-white green data voltage Dg−, and the data voltage on DM+5 is the normally-white blue data voltage Db−;

when scanning the pixel circuit in the row N+1, the data voltage on DM is the normally-white green data voltage Dg−, the data voltage on DM+1 is the normally-black red data voltage Dr+, the data voltage on DM+2 is the normally-white blue data voltage Db−, the data voltage on DM+3 is the normally-white green data voltage Dg−, the data voltage on DM+4 is the normally-black red data voltage Dr+, and the data voltage on DM+5 is the normally-black blue data voltage Db+;

when at least one embodiment of the pixel structure shown in FIG. 5 operating, the pixel circuits in row N may all be electrically connected to the gate line in row N, and the pixel circuits in row N+1 may all be electrically connected to the gate line in row N+1. When scanning a plurality of rows of pixel circuits in turn and displaying a solid-color image, the data voltages of the data lines in the various columns are constantly alternating between a high voltage and a low voltage, so that the drive signals in the pixel circuits are rapidly varied by the influence of the data voltages. The direction of the variations is no longer accumulated, and the amplitude of the variations is reduced, so as to reduce the incidence and the severity of a block crosstalk.

In at least one embodiment of the pixel structure shown in FIGS. 5, R11, B13, R14, R21, R24 and B26 may be replaced with the second type of pixel circuits, and G12, G15, B16, G22 and G25 may be replaced with the first type of pixel circuits.

In at least one embodiment of the pixel structure shown in FIG. 5, in order to control the consistency of the types of pixel circuits electrically connected to the monochromatic light-emitting elements, the red pixel circuits are all set as normally-black red pixel circuits, the green pixel circuits are all set as normally-white green pixel circuits, and the blue pixel circuits can be structured with two different types of circuits due to the lower brightness of the blue pixel circuits.

Optionally, the pixel circuits electrically connected to light-emitting elements of the same color are either first type of pixel circuits or second type of pixel circuits.

In at least one embodiment of the pixel structure shown in FIG. 2, the first pixel circuits are all first type of pixel circuits, the second pixel circuits are all first type of pixel circuits, and the third pixel circuits are all second type of pixel circuits. That is, the pixel circuits electrically connected to the light-emitting elements of the same color are all first type of pixel circuits or first type of pixel circuits, so as to facilitate Gamma adjustment.

In at least one embodiment of the present disclosure, in order to facilitate Gamma adjustment, the layout can be adjusted, so that the structures of pixel circuits of the same color pixel circuit are consistent.

In at least one embodiment of the present disclosure, in adjacent rows of pixel circuits, pixel circuits electrically connected to the same data line may be arranged in the same column.

As shown in FIG. 1, in the pixel circuit in the row N and the pixel circuit in the row N+1, R11 and B21 are both electrically connected to DM, G12 and G22 are both electrically connected to DM+1, B13 and R23 are both electrically connected to DM+2, and G14 and G24 are both electrically connected to DM+3.

As shown in FIG. 3, in the pixel circuit in the row N and the pixel circuit in the row N+1, R11 and R21 are both electrically connected to DM, G12 and G22 are both electrically connected to DM+1, B13 and B23 are both electrically connected to DM+2, R14 and R24 are both electrically connected to DM+3, G15 and G25 are both electrically connected to DM+4, and B16 and B26 are both electrically connected to DM+5.

As shown in FIG. 4, in the pixel circuit in the row N and the pixel circuit in the row N+1, R11 and R21 are both electrically connected to DM, G12 and G22 are both electrically connected to DM+1, B13 and B23 are both electrically connected to DM+2, R14 and R24 are both electrically connected to DM+3, G15 and G25 are both electrically connected to DM+4, and B16 and B26 are both electrically connected to DM+5.

In at least one embodiment of the present disclosure, in adjacent rows of pixel circuits, pixel circuits electrically connected to the same data line may be arranged in adjacent columns.

As shown in FIG. 2, B21 is electrically connected to DM, R11 and G22 are both electrically connected to DM+1, G12 and R23 are both electrically connected to DM+2, B13 and G24 are both electrically connected to DM+3, and G14 and B25 are both electrically connected to DM+4;

R11 and G22 are arranged in adjacent columns, G12 and R23 are arranged in adjacent columns, B13 and G24 are arranged in adjacent columns, and G14 and B25 are arranged in adjacent columns.

Figure 6:
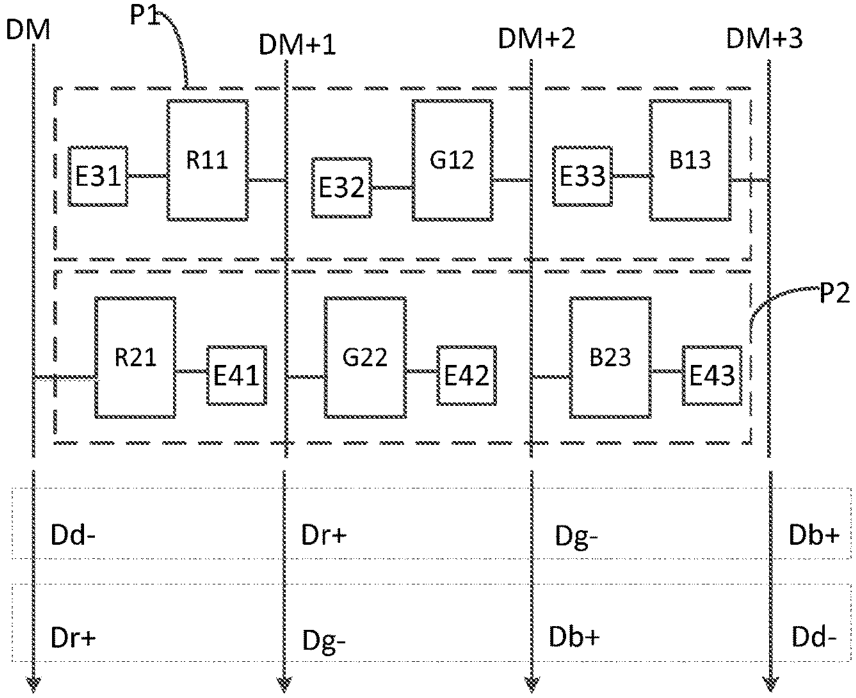
FIG. 6 is a schematic structural view of the pixel structure according to at least one embodiment of the present disclosure.

As shown in FIGS. 6, R11 and G22 are both electrically connected to DM+1, G12 and B23 are both electrically connected to DM+2, R11 and G22 are in adjacent columns, and G12 and B23 are in adjacent columns.

Figure 7:
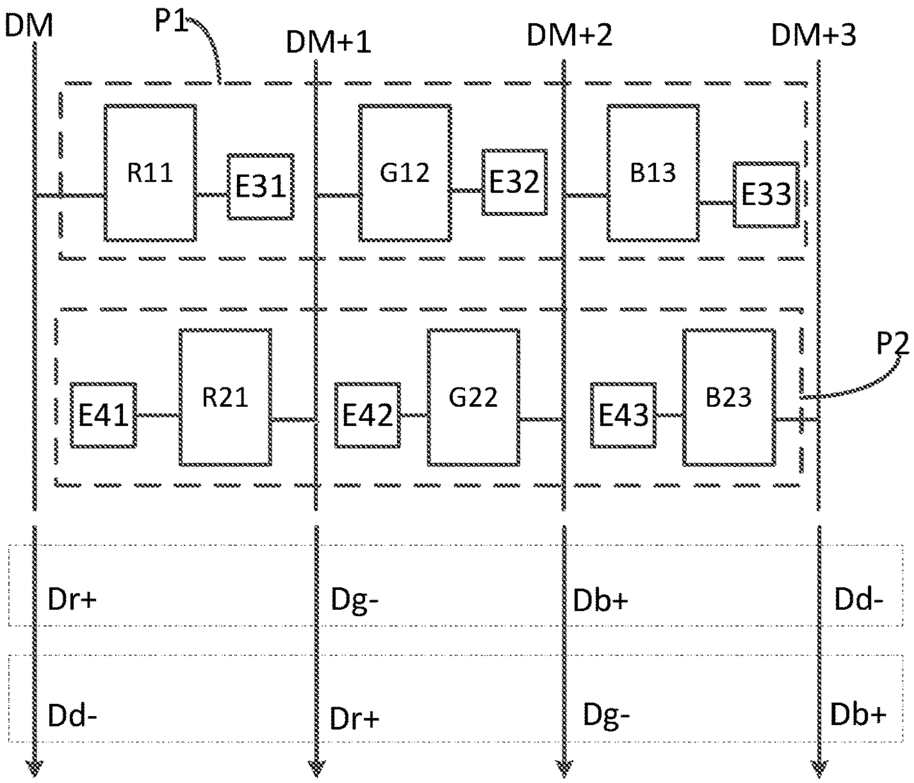
FIG. 7 is a schematic structural view of the pixel structure according to at least one embodiment of the present disclosure.

As shown in FIGS. 7, R21 and G12 are both electrically connected to DM+1, B13 and G22 are both electrically connected to DM+2, G12 and R21 are in adjacent columns, and B13 and G22 are in adjacent columns.

In specific implementation, when among adjacent rows of pixel circuits, pixel circuits electrically connected to the same data line are arranged in adjacent columns, among adjacent rows of pixel circuits, the first pixel circuit and the second pixel circuit are electrically connected to the same data line, and the third pixel circuit and the second pixel circuit are electrically connected to another data line.

In at least one embodiment of the present disclosure, among adjacent rows of pixel circuits, first pixel circuits arranged in the same column are electrically connected to data lines of different columns, second pixel circuits arranged in the same column are electrically connected to data lines of different columns, and third pixel circuits arranged in the same column are electrically connected to the data line of same column.

Optionally, the pixel structure includes a plurality of pixel units;

the pixel units include a plurality of pixel circuits arranged sequentially along a row direction; the pixel units are electrically connected to data lines of columns;

the plurality of pixel circuits includes a first pixel circuit, a second pixel circuit and a third pixel circuit;

the pixel circuits arranged in the same row are electrically connected to data lines of different columns respectively.

As shown in FIG. 5, the pixel structure includes a first pixel unit P1, a second pixel unit P2, a third pixel unit P3 and a fourth pixel unit P4;

the first pixel unit P1 includes a first pixel circuit R11 in row N and column M, a second pixel circuit G12 in row N and column M+1, and a third pixel circuit B13 in row N and column M+2, arranged sequentially along the row direction;

the second pixel unit P2 includes a first pixel circuit R14 in row N and column M+3, a second pixel circuit G15 in row N and column M+4, and a third pixel circuit B16 in row N and column M+5, arranged sequentially along the row direction;

the third pixel unit P3 includes a first pixel circuit R21 in row N+1 and column M, a second pixel circuit G22 in row N+1 and column M+1, and a third pixel circuit B23 in row N+1 and column M+2, arranged sequentially along the row direction;

the fourth pixel unit P4 includes a first pixel circuit R24 in row N+1 and column M+3, a second pixel circuit G25 in row N and column M+4, and a third pixel circuit B26 in row N and column M+5, arranged sequentially along the row direction.

In at least one embodiment shown in FIG. 5, among the pixel circuits in row N and the pixel circuits in row N+1, R11 and R21 are electrically connected to data lines of different columns, G12 and G22 are electrically connected to data lines of different columns, R14 and R24 are electrically connected to data lines of different columns, G15 and G25 are electrically connected to data lines of different columns, B13 and B23 are electrically connected to the data line of same column, and B16 and B25 are electrically connected to the data line of same column; pixel circuits arranged in the same row are electrically connected to data lines of different columns respectively.

As shown in FIG. 6, the pixel circuits include a first pixel unit P1 and a second pixel unit P2;

the first pixel unit P1 includes a first pixel circuit R11 in row N and column M, a second pixel circuit G12 in row N and column M+1, and a third pixel circuit B13 in row N and column M+2, arranged sequentially along the row direction;

the second pixel unit P2 includes a first pixel circuit R21 in row N+1 and column M, a second pixel circuit G22 in row N+1 and column M+1, and a third pixel circuit B23 in row N+1 and column M+2, arranged sequentially along the row direction;

R21 is electrically connected to data line DM in column M;

R11 and G22 are both electrically connected to data line DM+1 in column M+1;

G12 and B23 are both electrically connected to data line DM+2 in column M+2;

B13 is electrically connected to data line DM+3 in column M+3.

In FIG. 6, the light-emitting element labeled E31 is a red light-emitting element in row N and column M, the light-emitting element labeled E32 is a green light-emitting element in row N and column M+1, and the light-emitting element labeled E33 is a blue light-emitting element in row N and column M+2;

the light-emitting element labeled E41 is the red light-emitting element in row N+1 and column M, the light-emitting element labeled E42 is the green light-emitting element in row N+1 and column M+1, and the light-emitting element labeled E43 is the blue light-emitting element in row N+1 and column M+2;

R11 is electrically connected to E31, G12 is electrically connected to E32, B13 is electrically connected to E33, R21 is electrically connected to E41, G22 is electrically connected to E42, and B23 is electrically connected to E43.

In the case that at least one embodiment of the pixel structure shown in FIG. 6 operates, when scanning the pixel circuit in the row N, the data voltage on DM is the normally-white virtual data voltage Dd−, the data voltage on DM+1 is the normally-black red data voltage Dr+, the data voltage on DM+2 is the normally-white green data voltage Dg−, and the data voltage on DM+3 is the normally-black blue data voltage Db+;

when scanning the pixel circuit in the row N+1, the data voltage on DM is the normally-black red data voltage Dr+, the data voltage on DM+1 is the normally-white green data voltage Dg−, the data voltage on DM+2 is the normally-black blue data voltage Db+, and the data voltage on DM+3 is the normally-white virtual data voltage Dd−.

When at least one embodiment of the pixel structure shown in FIG. 6 operates, the pixel circuits in row N may all be electrically connected to the gate line in row N, and the pixel circuits in row N+1 may all be electrically connected to the gate line in row N+1. When scanning a plurality of rows of pixel circuits in turn and displaying a solid-color image, the data voltages of the data lines in the various columns are constantly alternating between a high voltage and a low voltage, so that the drive signals in the pixel circuits are rapidly varied by the influence of the data voltages. The direction of the variations is no longer accumulated, and the amplitude of the variations is reduced, so as to reduce the incidence and the severity of a block crosstalk.

As shown in FIG. 7, the pixel circuits include a first pixel unit P1 and a second pixel unit P2;

the first pixel unit P1 includes a first pixel circuit R11 in row N and column M, a second pixel circuit G12 in row N and column M+1, and a third pixel circuit B13 in row N and column M+2, arranged sequentially along the row direction;

the second pixel unit P2 includes a first pixel circuit R21 in row N+1 and column M, a second pixel circuit G22 in row N+1 and column M+1, and a third pixel circuit B23 in row N+1 and column M+2, arranged sequentially along the row direction;

R11 is electrically connected to data line DM in column M;

R21 and G12 are both electrically connected to data line DM+1 in column M+1;

G22 and B13 are both electrically connected to data line DM+2 in column M+2;

B23 is electrically connected to data line DM+3 in column M+3.

In FIG. 7, the light-emitting element labeled E31 is a red light-emitting element in row N and column M, the light-emitting element labeled E32 is a green light-emitting element in row N and column M+1, and the light-emitting element labeled E33 is a blue light-emitting element in row N and column M+2;

the light-emitting element labeled E41 is the red light-emitting element in row N+1 and column M, the light-emitting element labeled E42 is the green light-emitting element in row N+1 and column M+1, and the light-emitting element labeled E43 is the blue light-emitting element in row N+1 and column M+2;

R11 is electrically connected to E31, G12 is electrically connected to E32, B13 is electrically connected to E33, R21 is electrically connected to E41, G22 is electrically connected to E42, and B23 is electrically connected to E43.

In the case that at least one embodiment of the pixel structure shown in FIG. 7 operates, when scanning the pixel circuit in the row N, the data voltage on DM is the normally-black red data voltage Dr+, the data voltage on DM+1 is the normally-white green data voltage Dg−, the data voltage on DM+2 is the normally-black blue data voltage Db+, and the data voltage on DM+3 is the normally-white virtual data voltage Dd−;

when scanning the pixel circuit in the row N+1, the data voltage on DM is the normally-white virtual data voltage Dd−, the data voltage on DM+1 is the normally-black red data voltage Dr+, the data voltage on DM+2 is the normally-white green data voltage Dg−, and the data voltage on DM+3 is the normally-black blue data voltage Db+.

When at least one embodiment of the pixel structure shown in FIG. 7 operating, the pixel circuits in row N may all be electrically connected to the gate line in row N, and the pixel circuits in row N+1 may all be electrically connected to the gate line in row N+1. When scanning a plurality of rows of pixel circuits in turn and displaying a solid-color image, the data voltages of the data lines on the various columns are constantly alternating between a high voltage and a low voltage, so that the drive signals in the pixel circuits are rapidly varied by the influence of the data voltages. The direction of the variations is no longer accumulated, and the amplitude of the variations is reduced, so as to reduce the incidence and the severity of a block crosstalk.

In at least one embodiment of the present disclosure, the first type of pixel circuits include a first driving circuit, a first data writing circuit, a first energy storage circuit and a first reference voltage writing circuit;

the first driving circuit is electrically connected to a first node and the first light-emitting element, and is used for generating, under the control of a potential of the first node, a drive current to drive the first light-emitting element;

the first data writing circuit is electrically connected to a scan terminal, the data line and the first node, and is used for controlling, under the control of a scan signal provided by the scan terminal, the data line to provide a data voltage to the first node in a data writing phase.

the first reference voltage writing circuit is electrically connected to an initial control terminal, a first reference voltage terminal and the first node, and is used for writing, under the control of an initial control signal provided by the initial control terminal, a first reference voltage provided by the first reference voltage terminal into the first node in an initialization phase that is before the data writing phase;

the first energy storage circuit is electrically connected to the first node, and is used for storing electrical energy.

In specific implementation, when the first type of pixel circuit is in operation, the first reference voltage is written into the first node before data is written.

Optionally, the first light-emitting element may be an organic light-emitting diode, but not limited thereto.

Figure 8:
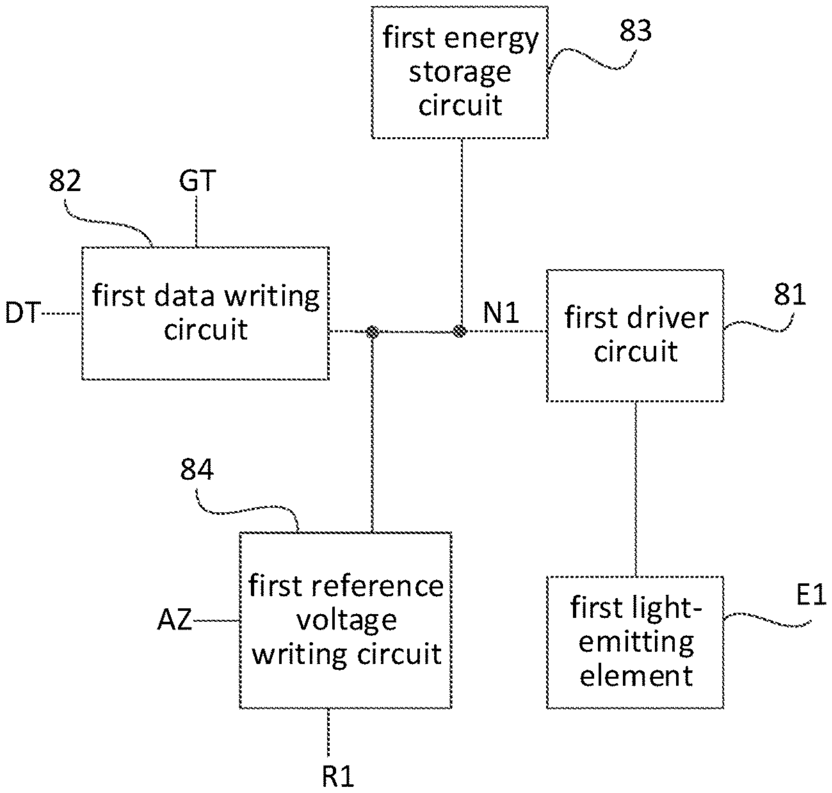
FIG. 8 is a schematic structural view of a first type of pixel circuit according to at least one embodiment.

As shown in FIG. 8, at least one embodiment of the first type of pixel circuit includes a first driver circuit 81, a first data writing circuit 82, a first energy storage circuit 83, and a first reference voltage writing circuit 84;

the first driving circuit 81 is electrically connected to a first node N1 and a first light-emitting element E1, and is used for generating, under the control of a potential of the first node N1, a drive current to drive the first light-emitting element E1;

the first data writing circuit 82 is electrically connected to a scan terminal GT, the data line DT and the first node N1, and is used for controlling, under the control of a scan signal provided by the scan terminal GT, the data line DT to provide a data voltage Vdt to the first node N1 in a data writing phase.

the first reference voltage writing circuit 84 is electrically connected to an initial control terminal AZ, a first reference voltage terminal R1 and the first node N1, and is used for writing, under the control of an initial control signal provided by the initial control terminal AZ, a first reference voltage Vref1 provided by the first reference voltage terminal R1 into the first node N1 in an initialization phase that is before the data writing phase;

the first energy storage circuit 83 is electrically connected to the first node N1, and is used for storing electrical energy.

Figure 9:
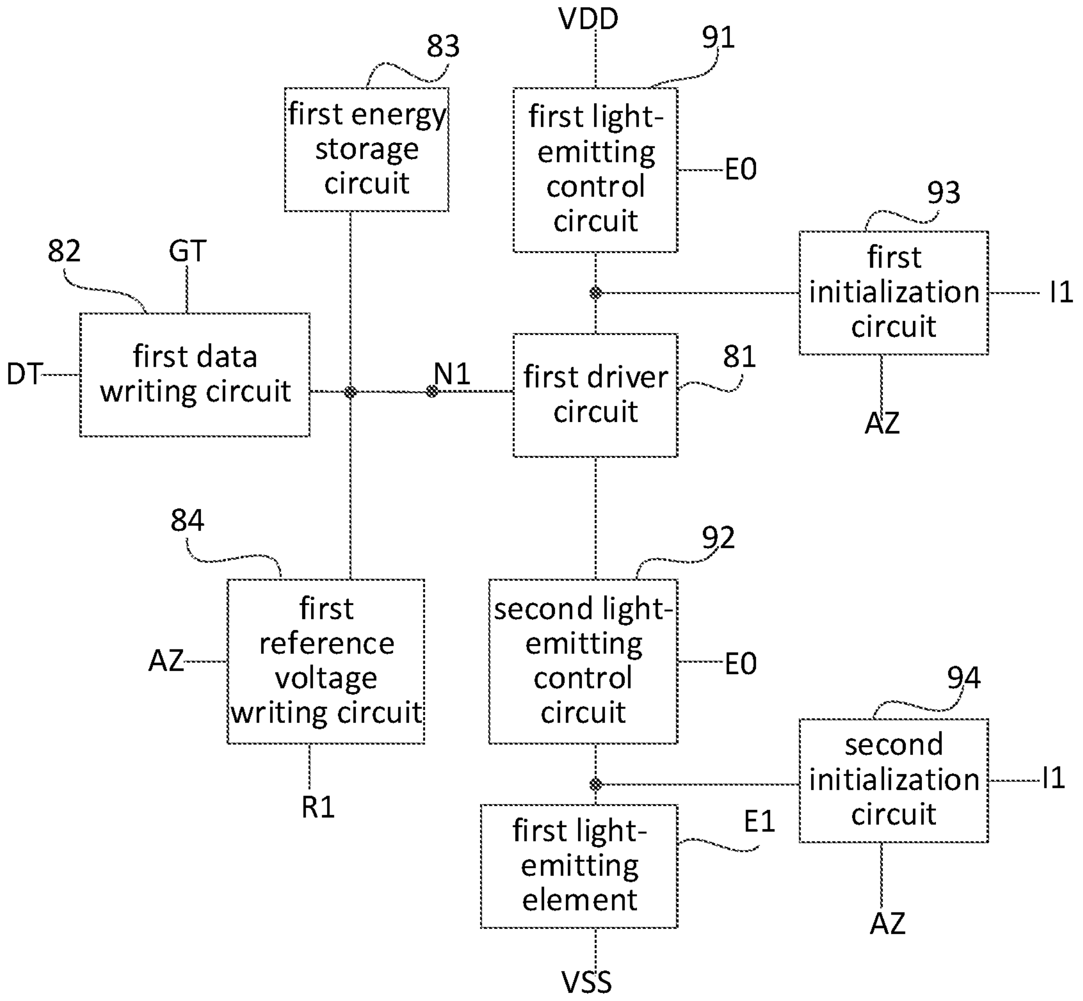
FIG. 9 is a schematic structural view of the first type of pixel circuit according to at least one embodiment.

As shown in FIG. 9, on the basis of at least one embodiment of the first type of pixel circuit shown in FIG. 8, at least one embodiment of the first type of pixel circuit may further include a first light-emitting control circuit 91, a second light-emitting control circuit 92, a first initialization circuit 93 and a second initialization circuit 94;

the first light-emitting control circuit 91 is electrically connected to a light-emitting control terminal E0, a high voltage terminal VDD and a first terminal of the first driving circuit 81, and is used for controlling, under the control of the light-emitting control signal provided by the light-emitting control terminal E0, the electrical connection between the high voltage terminal VDD and the first terminal of the first driving circuit 81;

the second light-emitting control circuit 92 is electrically connected to a light-emitting control terminal E0, a second terminal of the first driving circuit 81 and a first terminal of the first light-emitting element E1, and is used for controlling, under the control of light-emitting control signals provided by the light-emitting control terminal E0, the electrical connection between the second terminal of the first driving circuit 81 and the first terminal of the first light-emitting element E1; the second terminal of the first light-emitting element E1 is electrically connected to a low voltage terminal VSS;

the first initialization circuit 93 is electrically connected to an initial control terminal AZ, an initial voltage terminal I1 and a first terminal of the first driving circuit 81, and is used for writing, under the control of an initial control signal provided by the initial control terminal AZ, an initial voltage Vinit provided by the initial voltage terminal I1 into the first terminal of the first driving circuit 81;

the second initialization circuit 94 is electrically connected to the initial control terminal AZ, the initial voltage terminal I1 and the first terminal of the first light-emitting element E1, and is used for writing, under the control of the initial control signal, the initial voltage Vinit into the first terminal of the first light-emitting element E1.

Figure 10:
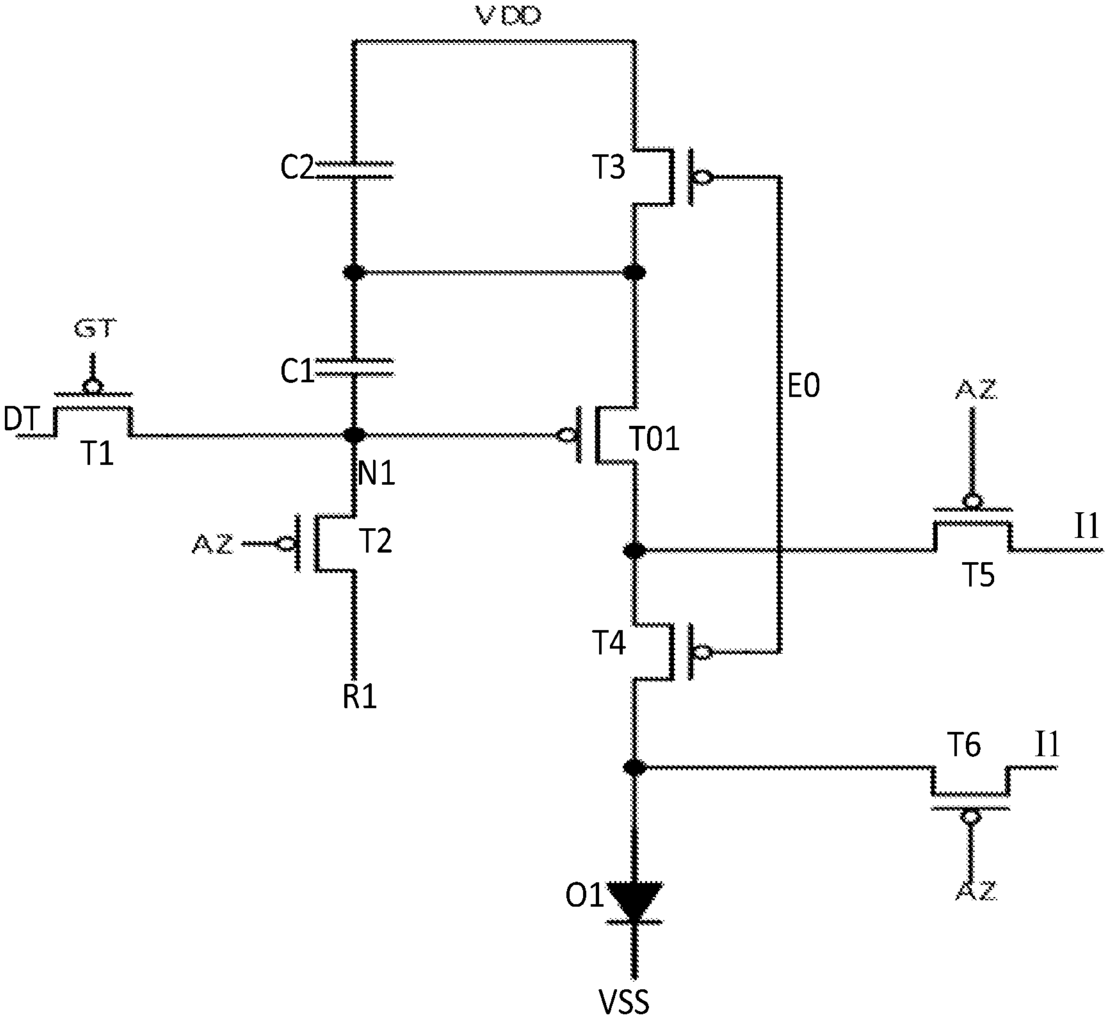
FIG. 10 is a schematic circuit view of the first type of pixel circuit according to at least one embodiment.

As shown in FIG. 10, on the basis of at least one embodiment of the first type of pixel circuit shown in FIG. 9, the first light emitting element is a first organic light-emitting diode O1; the first driving circuit includes a first drive transistor T01; the first data writing circuit includes a first transistor T1, the first reference voltage writing circuit includes a second transistor T2, the first energy storage circuit includes a first capacitor C1 and a second capacitor C2, the first light-emitting control circuit includes a third transistor T3, the second light-emitting control circuit includes a fourth transistor T4, the first initialization circuit 93 includes a fifth transistor T5, and the second initialization circuit 94 includes a sixth transistor T6;

the gate electrode of T01 is electrically connected to the first node N1;

a first terminal of C1 is electrically connected to the first node N1, the second terminal of C1 is electrically connected to the source electrode of T01, a first terminal of C2 is electrically connected to the second terminal of C1, and the second terminal of C2 is electrically connected to the high voltage terminal VDD;

the gate electrode of T1 is electrically connected to the scan terminal GT, the source electrode of T1 is electrically connected to the data line DT, and the drain electrode of T1 is electrically connected to the first node N1;

the gate electrode of T2 is electrically connected to the initial control terminal AZ, the source electrode of T2 is electrically connected to the first reference voltage terminal R1, and the drain electrode of T2 is electrically connected to the first node N1;

the gate electrode of T3 is electrically connected to the light-emitting control terminal E0, the source electrode of T3 is electrically connected to the high voltage terminal VDD, and the drain electrode of T3 is electrically connected to the source electrode of TO;

the gate electrode of T4 is electrically connected to the light-emitting control terminal E0, the source electrode of T4 is electrically connected to the drain electrode of TO, and the drain electrode of T4 is electrically connected to the anode of O1;

the gate electrode of T5 is electrically connected to the initial control terminal AZ, the source electrode of T5 is electrically connected to the initial voltage terminal I1, and the drain electrode of T5 is electrically connected to the drain electrode of T01;

the gate electrode of T6 is electrically connected to the initial control terminal AZ, the source electrode of T6 is electrically connected to the initial voltage terminal I1, and the drain electrode of T6 is electrically connected to the anode of O1.

In at least one embodiment of the first type of pixel circuit shown in FIG. 10, all transistors may be p-type transistors, but are not limited thereto.

Figure 11:
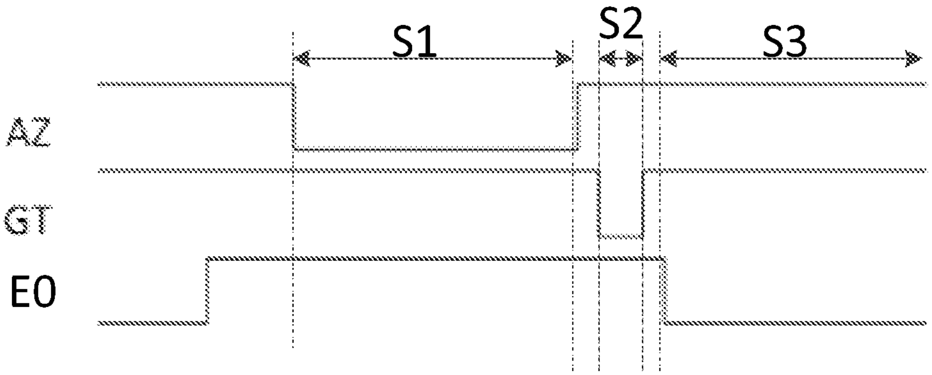
FIG. 11 is a schematic operation timing view of the first type of pixel circuit shown in FIG. 10 according to at least one embodiment.

As shown in FIG. 11, when at least one embodiment of the first type of pixel circuit shown in FIG. 10 is in operation, the display period may include an initialization phase S1, a data writing phase S2, and a light-emitting phase S3 that are set successively;

in the initialization phase S1, AZ provides a low voltage signal, both GT and E0 provide a high voltage signal, and T2, T5, and T6 are turned on, so that the first reference voltage Vref1 provided by the first reference voltage terminal R1 is written into the first node N1, and the initial voltage Vinit provided by the initial voltage terminal I1 is written into the drain electrode of T01 and the anode of O1. Therefore, T01 is enabled to turn on at the beginning of the data writing phase S2, and to control O1 not to emit light, and to remove the residual charges at the anode of O1.

In the data writing phase S2, AZ provides a high voltage signal, GT provides a low voltage signal, E0 provides a high voltage signal, and T1 is turned on, such that the data voltage Vdt provided by DT is written into the first node for data voltage writing and threshold voltage compensation.

In the light-emitting phase S3, both AZ and GT provide high voltage signals, E0 provides a low voltage signal, T3 and T4 are turned on, and T01 drives O1 to emit light.

In at least one embodiment of the present disclosure, the second type of pixel circuits includes a second light-emitting element, a second driving circuit, a second data writing circuit, a second energy storage circuit and a second reference voltage writing circuit;

the second driving circuit is electrically connected to a second node and the second light-emitting element, and is used for generating, under the control of a potential of the second node, a drive current to drive the second light-emitting element;

the second energy storage circuit is electrically connected to the second node and a third node, and is used for storing electrical energy;

the second data writing circuit is electrically connected to a scan terminal, the data line and the third node, and is used for controlling, under the control of a scan signal provided by the scan terminal, the data line to provide a data voltage to the third node in a data writing phase;

the second reference voltage writing circuit is electrically connected to a light-emitting control terminal, a second reference voltage terminal and the third node, and is used for writing, under the control of a light-emitting control signal provided by the light-emitting control terminal, a second reference voltage provided by the second reference voltage terminal into the third node in a light-emitting phase that is after the data writing phase.

In specific implementation, when the second type of pixel circuit is in operation, the first reference voltage is written into the first node after data is written.

Figure 12:
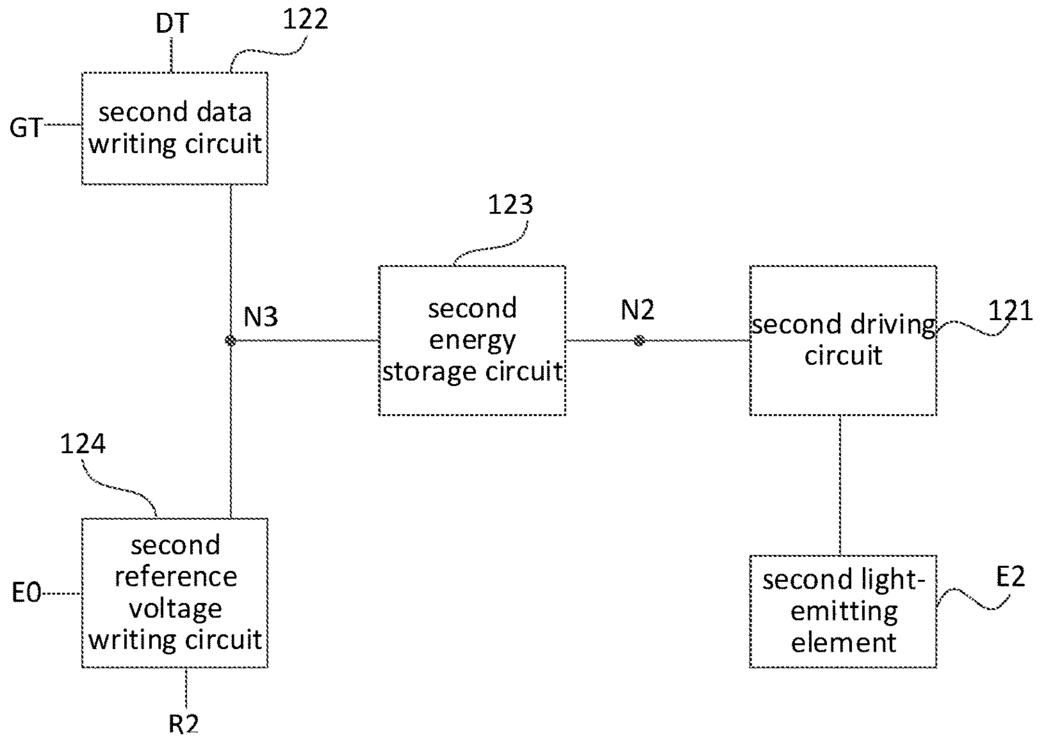
FIG. 12 is a schematic structural view of a second type of pixel circuit according to at least one embodiment.

As shown in FIG. 12, the second type of pixel circuit includes a second driving circuit 121, a second data writing circuit 122, a second energy storage circuit 123 and a second reference voltage writing circuit 124;

the second driving circuit 121 is electrically connected to a second node N2 and the second light-emitting element E2, and is used for generating, under the control of a potential of the second node N2, a drive current to drive the second light-emitting element E2;

the second energy storage circuit 123 is electrically connected to the second node N2 and a third node N3, and is used for storing electrical energy;

the second data writing circuit 122 is electrically connected to a scan terminal GT, the data line DT and the third node N3, and is used for controlling, under the control of a scan signal provided by the scan terminal GT, the data line DT to provide a data voltage Vdt to the third node N3 in a data writing phase;

the second reference voltage writing circuit 124 is electrically connected to a light-emitting control terminal E0, a second reference voltage terminal R2 and the third node N3, and is used for writing, under the control of a light-emitting control signal provided by the light-emitting control terminal E0, a second reference voltage Vref2 provided by the second reference voltage terminal R2 into the third node N3 in a light-emitting phase that is after the data writing phase.

Figure 13:
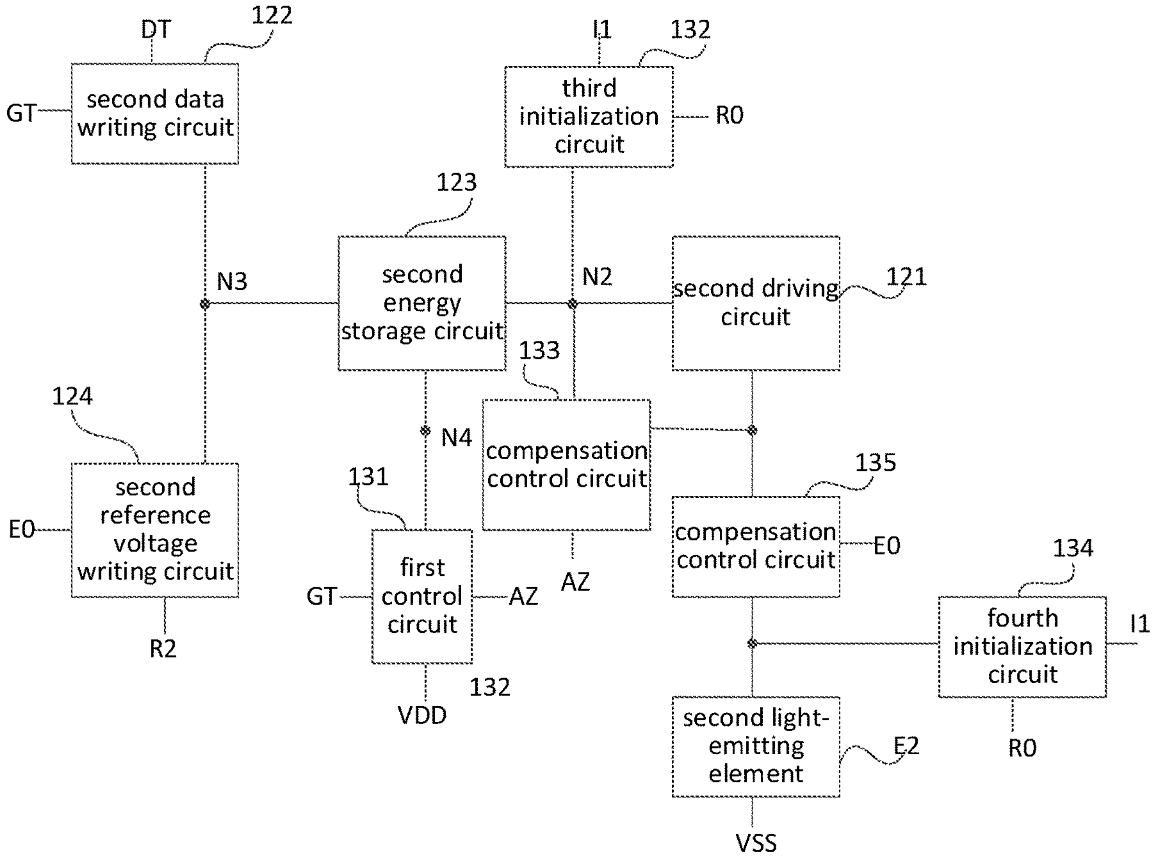
FIG. 13 is a schematic structural view of the second type of pixel circuit according to at least one embodiment.

As shown in FIG. 13, on the basis of at least one embodiment of the second type of pixel circuit shown in FIG. 12, the second type of pixel circuit further includes a first control circuit 131, a third initialization circuit 132, a compensation control circuit 133, a fourth initialization circuit 134, and a third light-emitting control circuit 135;

the second energy storage circuit 123 is also electrically connected to the fourth node N4; the first terminal of the second driving circuit 121 is electrically connected to the high voltage terminal VDD;

the first control circuit 131 is electrically connected to the initial control terminal AZ, the scan terminal GT, the high voltage terminal VDD and the fourth node N4, and is used for controlling, under the control of the initial control signal provided by the initial control terminal AZ, the electrical connection between the high voltage terminal VDD and the fourth node N4, and controlling, under the control of the scanning signal provided by the scan terminal GT, the electrical connection between the high voltage terminal VDD and the fourth node N4;

the third initialization circuit 132 is electrically connected to the reset terminal R0, the initial voltage terminal I1 and the second node N2, and is used for writing, under the control of the reset signal provided by the reset terminal R0, the initial voltage Vinit provided by the initial voltage terminal I1 into the second node N2;

the compensation control circuit 133 is electrically connected to the initial control terminal AZ, the second node N2 and the second terminal of the second driving circuit 121, and is used for controlling, under the control of the initial control signal, the electrical connection between the second node N2 and the second terminal of the second driving circuit 121;

the fourth initialization circuit 134 is electrically connected to the reset terminal R0, the initial voltage terminal I1 and the first terminal of the second light-emitting element E2, and is used for writing, under the control of the reset signal, the initial voltage Vinit to the first terminal of the second light-emitting element E2;

the third light-emitting control circuit 135 is electrically connected to THE light-emitting control terminal E0, the second terminal of the second driving circuit 121 and the first terminal of the second light-emitting element E2, and is used for controlling, under the control of the light-emitting control signal provided by the light-emitting control terminal E0, the electrical connection between the second terminal of the second driving circuit 121 and the first terminal of the second light-emitting element E2;

the second terminal of the second light emitting element E2 is electrically connected to the low voltage terminal VSS.

Figure 14:
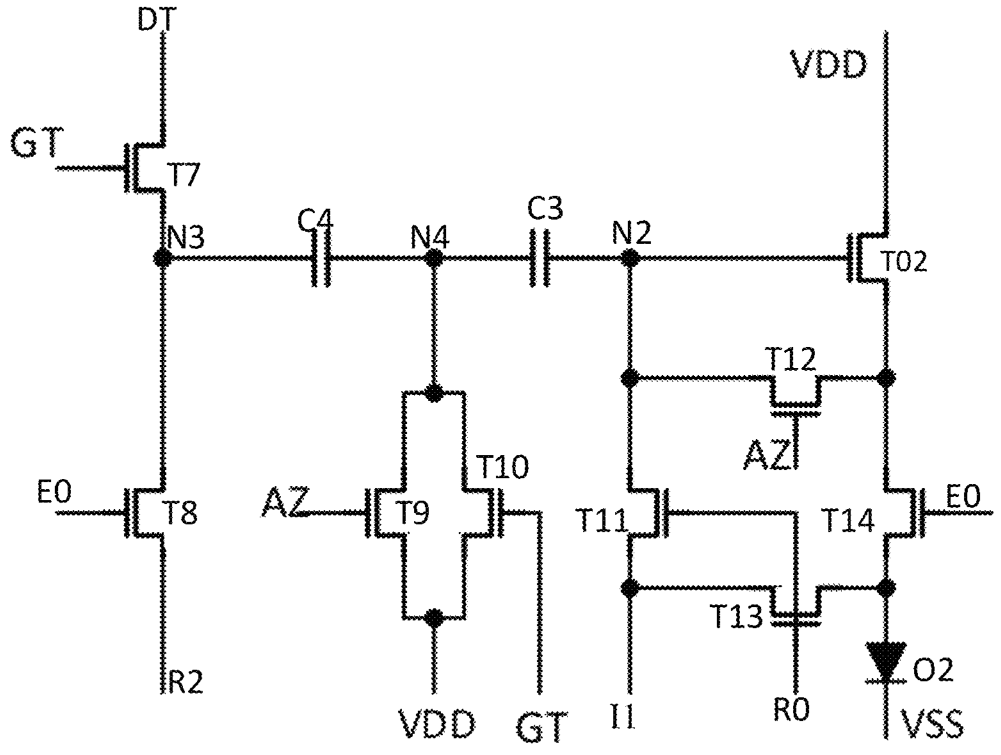
FIG. 14 is a schematic circuit view of a first type of pixel circuit according to at least one embodiment of the present disclosure.

As shown in FIG. 14, based on at least one embodiment of the second type of pixel circuit shown in FIG. 13, the second light-emitting element is a second organic light-emitting diode O2, the second driving circuit includes a second drive transistor T02, the second data writing circuit includes a seventh transistor T7, the second energy storage circuit includes a third capacitor C3 and a fourth capacitor C4, the second reference voltage writing circuit includes an eighth transistor T8, the first control circuit includes a ninth transistor T9 and a tenth transistor T10, the third initialization circuit includes an eleventh transistor T11, the compensation control circuit includes a twelfth transistor T12, the fourth initialization circuit includes a thirteenth transistor T13, and the third light emitting control circuit includes a fourteenth transistor T14;

the gate electrode of T02 is electrically connected to the first node N1, and the source electrode of T02 is electrically connected to the high voltage terminal VDD;

a first terminal of C3 is electrically connected to the second node N2, the second terminal of C3 is electrically connected to the fourth node N4, a first terminal of C4 is electrically connected to the fourth node N4, and the second terminal of C4 is electrically connected to the third node N3;

the gate electrode of T7 is electrically connected to the scan terminal GT, the source electrode of T7 is electrically connected to the data line DT, and the drain electrode of T7 is electrically connected to the third node N3;

the gate electrode of T8 is electrically connected to the light-emitting control terminal E0, the source electrode of T8 is electrically connected to the second reference voltage terminal R2, and the drain electrode of T8 is electrically connected to the third node N3, and the second reference voltage terminal R2 is used for providing the second reference voltage Vref2;

the gate electrode of T9 is electrically connected to the initial control terminal AZ, the source electrode of T9 is electrically connected to the high voltage terminal VDD, and the drain electrode of T9 is electrically connected to the fourth node N4;

the gate electrode of T10 is electrically connected to the scan terminal GT, the source electrode of T10 is electrically connected to the high voltage terminal VDD, and the drain electrode of T10 is electrically connected to the fourth node N4;

the gate electrode of T11 is electrically connected to the reset terminal R0, the source electrode of T11 is electrically connected to the initial voltage terminal I1, and the drain electrode of T11 is electrically connected to the second node N2;

the gate electrode of T12 is electrically connected to the initial control terminal AZ, the source electrode of T12 is electrically connected to the second node N2, and the drain electrode of T12 is electrically connected to the drain electrode of T02;

the gate electrode of T13 is electrically connected to the reset terminal R0, the source electrode of T13 is electrically connected to the initial voltage terminal I1, and the drain electrode of T13 is electrically connected to the anode of O2; the cathode of O2 is electrically connected to the low voltage terminal VSS;

the gate electrode of T14 is electrically connected to the light-emitting control terminal E0, the source electrode of T14 is electrically connected to the drain electrode of T02, and the drain electrode of T14 is electrically connected to the anode of O2; the cathode of O2 is electrically connected to the low voltage terminal VSS.

In at least one embodiment of the second type of pixel circuit shown in FIG. 14, all transistors are p-type transistors, but are not limited thereto.

Figure 15:
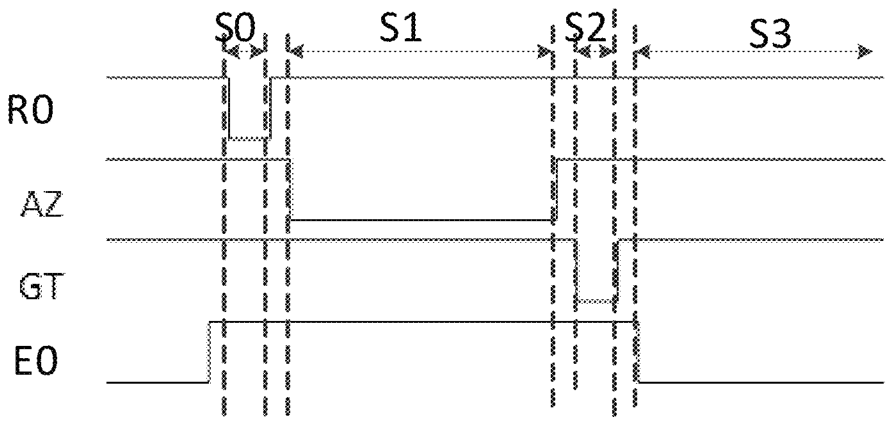
FIG. 15 is a schematic operation timing view of the first type of pixel circuit shown in FIG. 14 according to at least one embodiment.

As shown in FIG. 15, when at least one embodiment of the second type of pixel circuit shown in FIG. 14 is in operation, the display period includes a reset phase S0, an initialization phase S1, a data writing phase S2, and a light-emitting phase S3 that are arranged successively in that order;

in the reset phase S0, R0 provides a low voltage signal, each of AZ, GT and E0 provides a high voltage signal, and T11 and T13 are turned on, so as to write the Vinit provided by I1 to the anode of O2 and the second node N2;

in the initialization phase S1, R0 provides a high voltage signal, AZ provides a low voltage signal, each of GT and E0 provides a high voltage signal, T9 is turned on, so as to control the electrical connection between the fourth node N4 and VDD, and T12 is turned on to connect the gate electrode of T02 to the drain electrode of T02;

in the data writing phase S2, each of R0 and AZ provides a high voltage signal, GT provides a low voltage signal, E0 provides a high voltage signal, T10 is turned on to control the electrical connection between VDD and the fourth node N4, and T7 is turned on to write the data voltage Vdt provided by DT to the third node N3;

in the light-emitting phase S3, E0 provides a low voltage signal, each of R0, AZ and GT provides a high voltage signal, T14 is turned on, and T02 drives O2 to emit light.

Figure 16:
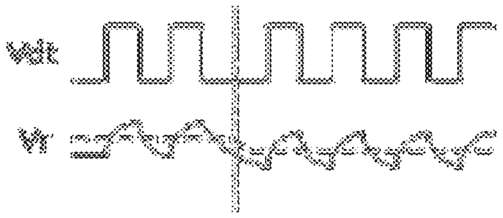
FIG. 16 is a schematic waveform view of a data voltage Vdt and a disturbed signal Vr according to at least one embodiment of the present disclosure.

As shown in FIG. 16, the voltage of the data voltage Vdt keeps changing between the high voltage and the low voltage, and the disturbance on another signal line within the pixel also alternates rapidly between positive and negative. Since each of signal lines has its respective capacitance, the respective capacitance can have a filtering effect on the signal of high frequency when it receives the perturbation, which can control the amplitude of the signal jump. At the same time, when the crosstalk pattern appears, the difference between the change in signal voltage of the image data during switching and the change in signal voltage of the solid color area is very small. In FIG. 16, Vr is the disturbed signal.

Figure 17:
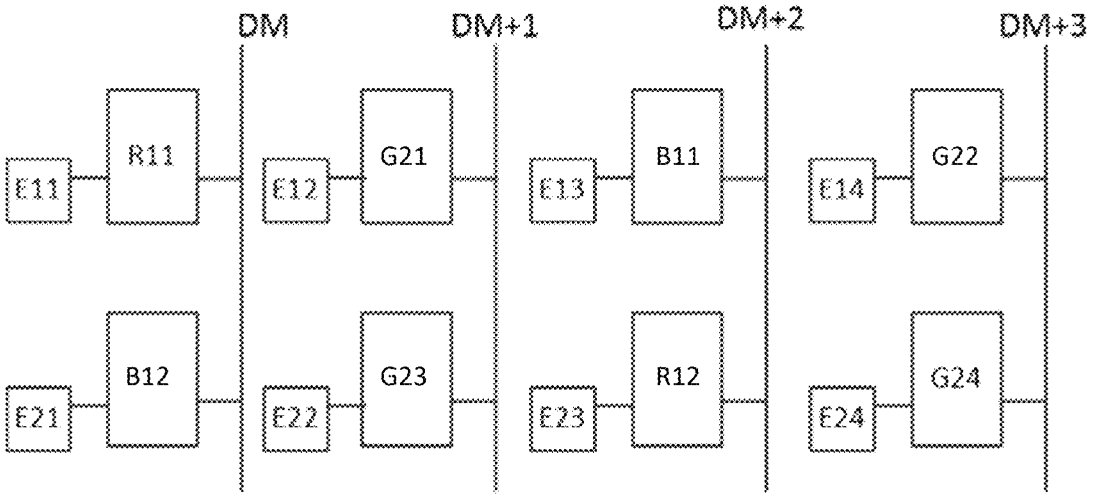
FIG. 17 is a schematic structural view of the pixel structure according to at least one embodiment of the present disclosure.

In an embodiment of the present disclosure, the pixel circuits electrically connected to the light-emitting elements of a same color are all either the first type of pixel circuits or the second type of pixel circuits. For example, as shown in FIG. 17, the pixel circuits R11 and R12 are electrically connected to the red light-emitting elements E11 and E23, respectively; the pixel circuits G21, G22, G23, and G24 are electrically connected to the green light-emitting elements E12, E14, E22 and E24, respectively; the pixel circuits B11 and B12 are electrically connected to the blue light-emitting elements E13 and E21, respectively. The pixel circuits R11, R12, B11 and B12 are all first type of pixel circuits, and the pixel circuits G21, G22, G23, and G24 are all second type of pixel circuits.

The display panel described in embodiments of the present disclosure includes the pixel structure described above.

The display device described in embodiments of the present disclosure includes the display panel as described above.

The above descriptions are preferred embodiments of the present disclosure. It should be noted that for a person of ordinary skill in the art, a number of improvements and embellishments may be made without departing from the principles described in the present disclosure, and the improvements and embellishments should also be regarded as falling within the protection scope of the present disclosure.

What is claimed is:

1. A pixel structure, comprising:

a plurality of pixel circuits arranged in rows and columns, the plurality of pixel circuits comprising a first type of pixel circuit and a second type of pixel circuit;

a data line electrically connected to the pixel circuits, and used for providing a data voltage to the pixel circuits, wherein the pixel circuits that are in two adjacent rows and electrically connected to one of the data lines are the first type of pixel circuit and the second type of pixel circuit, respectively; and a plurality of light-emitting elements, comprising a first light-emitting element electrically connected to the first type of pixel circuit and a second light-emitting element electrically connected to the second type of pixel circuit;

wherein a display brightness of the first light-emitting element increases as the data voltage provided to the first type of pixel circuit increases; a display brightness of the second light-emitting element decreases as data voltage provided to the second type of pixel circuit increases;

wherein the first type of pixel circuit comprises a first driving circuit, a first data writing circuit, a first energy storage circuit and a first reference voltage writing circuit;

the first driving circuit is electrically connected to a first node and the first light-emitting element, and is used for generating, under the control of a potential of the first node, a drive current to drive the first light-emitting element;

the first data writing circuit is electrically connected to a scan terminal, the data line and the first node, and is used for controlling, under the control of a scan signal provided by the scan terminal, the data line to provide a data voltage to the first node in a data writing phase;

the first reference voltage writing circuit is electrically connected to an initial control terminal, a first reference voltage terminal and the first node, and is used for writing, under the control of an initial control signal provided by the initial control terminal, a first reference voltage provided by the first reference voltage terminal into the first node in an initialization phase that is before the data writing phase;

the first energy storage circuit is electrically connected to the first node, and is used for storing electrical energy.

2. The pixel structure according to claim 1, wherein the pixel circuits arranged in the same row are all either the first type of pixel circuits or the second type of pixel circuits.

3. The pixel structure according to claim 1, wherein among the pixel circuits arranged in the same row, the adjacent pixel circuits are the first type pixel circuit and the second type of pixel circuit, respectively.

4. The pixel structure according to claim 1, wherein among the pixel circuits arranged in the same row, all of first pixel circuits are either the first type of pixel circuits or the second type of pixel circuits; and/or, a second pixel circuit is either the first type of pixel circuit or the second type of pixel circuit;

the light-emitting element electrically connected to the first pixel circuit is a first color light-emitting element, and the light-emitting element electrically connected to the second pixel circuit is a second color light-emitting element.

5. The pixel structure according to claim 4, wherein among the pixel circuits arranged in the same row, part of third pixel circuits are the first type of pixel circuits and another part of the third pixel circuits are the second type of pixel circuits;

the light-emitting element electrically connected to the third pixel circuit is a third color light-emitting element.

6. The pixel structure according to claim 5, wherein among the pixel circuits arranged in adjacent rows, the pixel circuits electrically connected to a same data line are arranged in adjacent columns.

7. The pixel structure according to claim 6, wherein among the pixel circuits arranged in adjacent rows, both the first pixel circuit and the second pixel circuit are electrically connected to the same data line, and both the third pixel circuit and the second pixel circuit are electrically connected to another data line.

8. The pixel structure according to claim 5, wherein among the pixel circuits arranged in adjacent rows, the first pixel circuits arranged in a same column are electrically connected to data lines of different columns, the second pixel circuits arranged in a same column are electrically connected to data lines of different columns, and the third pixel circuits arranged in a same column are electrically connected to the data line of a same column.

9. The pixel structure according to claim 8, wherein the pixel structure comprises pixel units, the pixel units comprising pixel circuits arranged sequentially along a row direction; the pixel units are electrically connected to data lines of columns; the pixel circuits comprise the first pixel circuit, the second pixel circuit and the third pixel circuit;

the pixel circuits arranged in the same row are electrically connected to data lines of different columns, respectively.

10. The pixel structure according to claim 5, wherein a color of the first color light-emitting element, a color of the second color light-emitting element and a color of the third color light-emitting element are different from each other.

11. The pixel structure according to claim 1, wherein first pixel circuits are all either the first type of pixel circuits or the second type of pixel circuits; and/or, a second pixel circuit is either the first type of pixel circuit or the second type of pixel circuit;

the light-emitting element electrically connected to the first pixel circuit is a first color light-emitting element, and the light-emitting element electrically connected to the second pixel circuit is a second color light-emitting element.

12. The pixel structure according to claim 1, wherein the pixel circuits electrically connected to the light-emitting elements of a same color are all either the first type of pixel circuits or the second type of pixel circuits.

13. The pixel structure according to claim 1, wherein among the pixel circuits arranged in adjacent rows, the pixel circuits electrically connected to the same data line are arranged in a same column.

14. The pixel structure according to claim 1, wherein the second type of pixel circuit comprises a second driving circuit, a second data writing circuit, a second energy storage circuit and a second reference voltage writing circuit;

the second driving circuit is electrically connected to a second node and the second light-emitting element, and is used for generating, under the control of a potential of the second node, a drive current to drive the second light-emitting element;

the second energy storage circuit is electrically connected to the second node and a third node respectively, and is used for storing electrical energy;

the second data writing circuit is electrically connected to the scan terminal, the data line and the third node, and is used for writing, under the control of the scan signal provided by the scan terminal, the data voltage provided by the data line into the third node in the data writing phase;

the second reference voltage writing circuit is electrically connected to a light-emitting control terminal, a second reference voltage terminal and the third node, and is used for writing, under the control of a light-emitting control signal provided by the light-emitting control terminal, a second reference voltage provided by the second reference voltage terminal into the third node in a light-emitting phase that is after the data writing phase.

15. A display panel, comprising the pixel structure according to claim 1.

16. A display device, comprising the display panel according to claim 15; and a display driver configured to drive the display panel.

17. The display panel according to claim 15, wherein the pixel circuits arranged in the same row are all either the first type of pixel circuits or the second type of pixel circuits.

18. The display panel according to claim 15, wherein among the pixel circuits arranged in the same row, the adjacent pixel circuits are the first type pixel circuit and the second type of pixel circuit, respectively.

19. The display panel according to claim 15, wherein among the pixel circuits arranged in the same row, all of first pixel circuits are either the first type of pixel circuits or the second type of pixel circuits; and/or, a second pixel circuit is either the first type of pixel circuit or the second type of pixel circuit;

the light-emitting element electrically connected to the first pixel circuit is a first color light-emitting element, and the light-emitting element electrically connected to the second pixel circuit is a second color light-emitting element.

* * * * *